United States Patent [19]
Sasaki et al.

[11] Patent Number: 5,766,766
[45] Date of Patent: Jun. 16, 1998

[54] MAGNETIC RECORDING MEDIUM HAVING A PROTECTIVE CARBON FILM WHICH CONTAINS A MATERIAL WHICH FLUORESCES

[75] Inventors: Katsumi Sasaki; Noriyuki Kitaori; Osamu Yoshida; Junko Ishikawa; Katsumi Endho, all of Ichikaimachi, Japan

[73] Assignee: Kao Corporation, Tokyo, Japan

[21] Appl. No.: 715,018

[22] Filed: Sep. 17, 1996

[30] Foreign Application Priority Data

| Sep. 21, 1995 | [JP] | Japan | 7-242998 |
| Sep. 26, 1995 | [JP] | Japan | 7-247195 |
| Nov. 20, 1995 | [JP] | Japan | 7-300919 |
| Feb. 27, 1996 | [JP] | Japan | 8-039277 |

[51] Int. Cl.$^6$ .................................................. G11B 5/66
[52] U.S. Cl. ................... 428/408; 428/694 TC; 428/694 TF; 428/900
[58] Field of Search ............... 428/408, 694 TC, 428/694 TF, 900

[56] References Cited

U.S. PATENT DOCUMENTS

| 5,607,783 | 3/1997 | Onodera | 428/694 T |
| 5,614,314 | 3/1997 | Itoh et al. | 428/332 |

Primary Examiner—Stevan A. Resan
Attorney, Agent, or Firm—Oblon, Spivak, McClelland, Maier & Neustadt, P.C.

[57] ABSTRACT

In order to improve a corrosion resistance and a running stability of a magnetic recording medium having a protective layer comprising a diamond-like carbon thin film and reduce cupping, the protective layer formed on the magnetic layer is composed of the diamond-like carbon thin film containing a material which fluoresces.

5 Claims, 16 Drawing Sheets

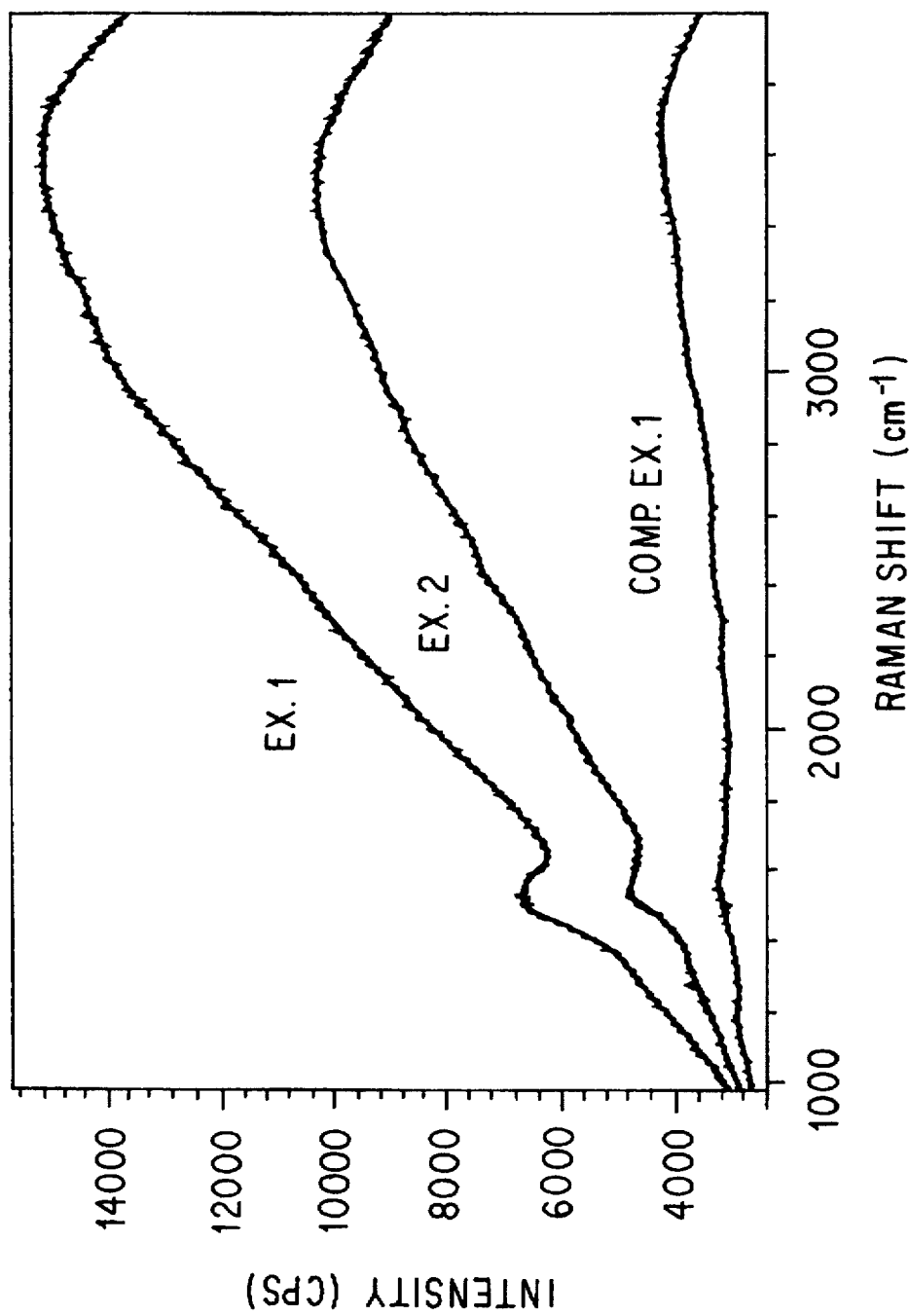

MAGNETIC RECORDING MEDIUM HAVING A PROTECTIVE CARBON FILM WHICH CONTAINS A MATERIAL WHICH FLUORESCES

BACKGROUND OF THE INVENTION

1. Field of the Invention

The present invention relates to a magnetic recording medium, more specifically to a magnetic recording medium in which a protective layer comprising a carbon film is formed on a magnetic layer and which is excellent in a corrosion resistance, a running stability and cupping.

2. Arts in the Background

Since a so-called metal thin film type magnetic recording medium in which metal is deposited on a support by vapor deposition under vacuum does not at all contain a binder in a magnetic layer, and therefore a density of a magnetic material can be raised, it is considered promising for high density recording.

However, in the magnetic layer of the metal thin film type magnetic recording medium, metal is merely deposited on a support and therefore is inferior in a corrosion resistance, a durability and a running stability. For the purpose of improving this, fluorine series lubricants such as perfluoropolyether, hydrocarbon series lubricants, and lubricants prepared by combining them have so far been applied, or a protective layer comprising a non-magnetic substance have so far been provided on a magnetic layer.

Further, in these days, a method in which a thin film comprising diamond-like carbon is formed as a protective layer is known on a magnetic layer. A diamond-like carbon thin film is considered to have a structure in which a graphite bond and a diamond bond are present by mixture.

Methods by which diamond-like thin film are formed on magnetic layers include methods using RF (Radio Frequency) plasma CVD (Chemical Vapor Deposition) or ECR (Electron Cyclotron Resonance) plasma CVD. Among these methods, ECR plasma CVD is a method in which a microwave is applied on a feed gas under high vacuum to turn the gas into plasma to thereby form a thin film on the objective (on a magnetic layer) and is generally used for forming a diamond-like carbon thin film.

In order to improve a durability more, a method in which a thin film closer to diamond is formed has so far been employed. However, there have been the problems that diamond-like carbon which is close to a composition of diamond has certainly an excellent durability but does not provide a stable friction coefficient because of an inferior binding property with a lubricant and is inferior in a corrosion resistance and that cupping is marked because of a large tension of diamond-like carbon itself.

In magnetic tapes, instead of a coating type tape using a binder resin, a metal thin film type tape using no binder resin is proposed as a magnetic layer provided on a support, due to demand for high density recording. That is, magnetic tapes in which magnetic layers are formed by wet plating techniques such as electroless plating and dry plating techniques such as vacuum deposition, sputtering and ion plating are proposed. This kind of magnetic tape has high packing densities of magnetic substances and are suited to high density recording.

It is proposed to provide various protective layers on the surface in order to protect a metal magnetic layer in this magnetic tape. For example, a diamond-like carbon film is one of these proposals. Diamond-like carbon films are provided by means of CVD (chemical vapor deposition) apparatuses such as, for example, a heat filament CVD apparatus, an optical CVD apparatus, an RF plasma CVD apparatus, a microwave plasma CVD apparatus, and an ECR microwave plasma CVD apparatus.

However, it has been found that conventional diamond-like carbon films are not sufficiently satisfactory. In particular, it has been found that in the case where, instead of magnetic disk for which a hard disk is used as a support, a magnetic tape for which a flexible plastic material is used, particularly a magnetic tape used for helical scan system recording reproducing device, a durability, a running property and an output are not satisfactory.

It has been a usual practice to provide a protective layer on a magnetic layer for the purpose to improve characteristics such as a corrosion resistance and a durability of a magnetic recording medium. Such protective layer comprises a non-magnetic material and is composed of, for example, diamond-like carbon, and various carbides, nitrides and oxides such as boron carbide, silicon carbide, boron nitride, silicon nitride, silicon oxide, and aluminum oxide. Among them, particularly carbon thin films such as diamond-like carbon (DLC) are paid attention as a promising one for a protective layer because of excellent characteristics thereof on a hardness and a sliding property.

A DLC thin film is an amorphous carbon thin film in which a graphite bond and a diamond bond are present by mixture, and it is formed on a magnetic layer by means of high frequency sputtering and Plasma CVD. And, various attempts have so far been made for the purpose of improving a hardness of a DLC thin film by raising a diamond bond thereof, that is, increasing a ratio $SP^3/SP^2$.

Thus, concern to the protective layers of DLC and others is directed primarily to an increase in the hardness. However, if a hardness of the protective layer is raised, for example, if a component of a diamond bond in DLC is increased, several inconveniences are brought about in some cases depending on uses while advantages brought by an increase in the hardness can be given.

For example, when a protective layer in which a hardness is increased is applied to a magnetic tape, the inconveniences that an elasticity of the tape is damaged and head touch is deteriorated are produced.

DISCLOSURE OF THE INVENTION

The present invention provides a magnetic recording medium comprising a support, a magnetic layer formed on the support, and a protective layer formed on the magnetic layer and comprising a carbon thin film, wherein the carbon thin film has a ratio of an intensity ($C_{2000}$) in 2000 $cm^{-1}$ to an intensity ($C_{1000}$) in 1000 $cm^{-1}$ of $C_{2000}/C_{1000} \geq 1.8$, which is determined by Raman spectroscopic analysis.

Also, the present invention provides a magnetic recording medium as described above, wherein the carbon thin film contains a material emitting radiation, in particular fluorescence.

Further, the present invention provides a magnetic recording medium as described above, wherein the carbon thin film has a peak in a region of 1400 to 1600 $cm^{-1}$ in a Raman spectroscopic spectrum, and a ratio $I_B/I_G$ of a background intensity $I_B$ to a peak intensity $I_G$ in this peak is 0.56 or more and less than 1.0. The ratio is preferably 1/1.8 to 1/1.2.

The present invention provides a magnetic recording medium comprising a support, a magnetic layer formed on the support, and a protective layer formed on the magnetic layer, wherein a Raman spectrum in the protective layer described above satisfies a relation in which a gradient $a=(I_{2000}-I_{800})/(2000-800)$ between an intensity $(I_{800})$ in 800 cm$^{-1}$ and an intensity $(I_{2000})$ in 2000 cm$^{-1}$ is $a \geq 1.0$ after carrying out a blank correction.

The carbon thin film is preferably a diamond-like carbon thin film.

Intensive investigations made by the present inventors have resulted in finding that an excellent corrosion resistance and a stable friction coefficient can be obtained and generation of cupping can be reduced by increasing a material emitting fluorescence contained in diamond-like carbon forming a protective layer, and thus coming to complete the first embodiment of the present invention.

That is, the first embodiment of the present invention provides a magnetic recording medium comprising a support, a magnetic layer formed on the support, and a protective layer formed on the magnetic layer and comprising a diamond-like carbon thin film containing a material emitting fluorescence, wherein the diamond-like carbon thin film described above has a ratio of an intensity $(C_{2000})$ in 2000 cm$^{-1}$ to an intensity $(C_{1000})$ in 1000 cm$^{-1}$ of $C_{2000}/C_{1000} \geq 1.8$, which is determined by Raman spectroscopic analysis.

The magnetic recording medium of the first embodiment of the present invention has the protective layer comprising a diamond-like carbon thin film, which is formed on the magnetic layer formed on the support by vapor deposition. In particular, the diamond-like carbon thin film in which a ratio of an intensity $(C_{2000})$ in 2000 cm$^{-1}$ to an intensity $(C_{1000})$ in 1000 cm$^{-1}$ in a chart of the Raman spectroscopic analysis is $C_{2000}/C_{1000} \geq 1.8$. The Raman spectroscopic analysis presents a barometer for knowing the number of unsaturated bonds contained in the diamond-like carbon thin film. The diamond-like carbon thin film in which the two intensities described above in the Raman spectroscopic analysis satisfy the relation described above is excellent in a corrosion resistance and a durability because molecules to which a limited number of carbons are bonded and various molecules having double bonds are present at random and a binding property to a lubricant is improved.

In the first embodiment of the present invention, ⌈emitting fluorescence⌋ means emitting fluorescence when a laser ray is applied in the following conditions:

| Wavelength of the laser ray: | 488 nm |
|---|---|
| Power: | 300 mW |
| Applying time: | 600 seconds |

These conditions are also conditions for the Raman spectroscopic analysis in the first embodiment of the present invention. The diamond-like carbon thin film containing the material emitting fluorescence as described above and having a specific Raman intensity ratio can be formed on the magnetic layer by conventional ECR plasma CVD, wherein a carbon source comprising compounds having covalent bonds, suitably benzene can be used as a raw material. The ECR plasma CVD can be carried out in the conditions of publicly known methods; usually, a frequency of a microwave is 2.45 GHz; an output is 100 to 900 W; and benzene gas is flowed so that the vacuum degree is 10$^{-1}$ to 10$^{-4}$ Torr.

In the magnetic recording medium of the first embodiment of the present invention, the protective layer comprising the diamond-like carbon thin film has preferably a thickness of 50 to 200 Å.

In the magnetic recording medium of the first embodiment of the present invention, the magnetic layer may be of a coating type but is preferably a metal thin film type magnetic layer formed by vapor deposition. Magnetic materials for forming the metal thin film type magnetic layer include ferromagnetic metallic materials which are used for conventional metal thin film type magnetic recording media. They include, for example, ferromagnetic metals such as Co, Ni and Fe, and ferromagnetic alloys such as Fe—Co, Fe—Ni, Co—Ni, Fe—Co—Ni, Fe—Cu, Co—Cu, Co—Au, Co—Y, Co—La, Co—Pr, Co—Gd, Co—Sm, Co—Pt, Ni—Cu, Mn—Bi, Mn—Sb, Mn—Al, Fe—Cr, Co—Cr, Ni—Cr, Fe—Co—Cr, and Ni—Co—Cr. The magnetic layer is preferably a thin film of at least one selected from a ferromagnetic alloy comprising primarily iron, cobalt and nickel, and nitrides or carbides thereof.

The magnetic layer of the magnetic recording medium is preferably formed on the substrate by oblique deposition in order to obtain high density recording. A method for the oblique deposition is not specifically restricted, and conventional methods are applied. A vacuum degree in deposition resides in a level of $10^{-3 \sim 4}$ to $10^{-7}$ Torr. The magnetic layer formed by deposition may be of a single layer structure or a multi-layer structure. In particular, the durability can be enhanced by forming an oxide on the surface of the magnetic layer by introducing an oxidizing gas.

In the present invention, the magnetic layer can be of a single layer or a multilayer. When the magnetic layer of a multilayer is formed by vapor deposition, the magnetic layer has, in the case of two layers, preferably a thickness of 100 to 2000 Å for a lower magnetic layer and a thickness of 50 to 1000 Å for an upper magnetic layer, and in the case of three layers, preferably a thickness of 100 to 2000 Å for a lower magnetic layer, a thickness of 100 to 1000 Å for an intermediate magnetic layer, and a thickness of 50 to 1000 Å for an upper magnetic layer. The magnetic layer may have many layers but 2 to 5 layers are considered suitable as a practical range.

In the magnetic recording medium of the first embodiment of the present invention, the support used includes polyesters such as polyethylene terephthalate and polyethylene naphthalate; polyolefins such as polyethylene and polypropylene; cellulose derivatives such as cellulose triacetate and cellulose diacetate; polycarbonate; polyvinyl chloride; polyimide; and plastics such as aromatic polyamide. These supports have thicknesses of 3 to 50 μm.

Further, in the magnetic recording medium of the first embodiment of the present invention, a back coat layer can be formed on a face opposite to a face of the support on which the magnetic layer is formed. The back coat layer may be formed by applying a paint prepared by dispersing carbon black and the like in a binder to a thickness of 0.3 to 1.0 μm (after drying) or may be formed by depositing metal or semi-metal on a support by vapor deposition. Various metals can be considered as metals deposited for the back coat layer, and Al, Cu, Zn, Sn, Ni, Ag, and alloys thereof are used. A Cu—Al alloy is preferred. Further, Si, Ge, As, Sc, and Sb are used as semi-metals for forming the back coat layer. Si is preferred. The back coat layer of a metal thin film type has a thickness of 0.05 to 1.0 μm.

Further, in the magnetic recording medium of the first embodiment of the present invention, a top coat layer comprising a suitable lubricant may be formed on the protective layer comprising the diamond-like carbon thin film as described above. The top coat layer may be formed by applying a solution prepared by dissolving a lubricant in a suitable solvent or may be formed by spraying a lubricant in a vacuum. When the top coat layer is formed by spraying a lubricant, the lubricant is preferably sprayed on the magnetic layer formed on the support by means of an atomizer (hereinafter called a supersonic atomizer) equipped with a supersonic oscillator. Fluorine series lubricants such as perfluoropolyether are preferred as the lubricant in either case of applying and spraying. To describe concretely, perfluoropolyether having a molecular weight of 2000 to 5000 is suitable and includes products which are commercially available in the market under trade names of, for example, ⌈FOMBLIN Z DIAC⌋ (modified carboxyl groups, manufactured by Monte Catini Co., Ltd:) and ⌉FOMBLIN Z DOL⌋ (modified by alcohol, manufactured by Monte Catini Co., Ltd.). A spraying amount of the lubricant can suitably be decided considering uses of the magnetic recording medium and the kind of the lubricant. The top coat layer formed has a thickness of 10 to 200 Å.

Thus, according to the first embodiment of the present invention, the magnetic recording medium which is excellent in a corrosion resistance and a stability of a friction coefficient and which has less cupping generated can be obtained.

Next, the second and third embodiments of the present invention have an object to provide a magnetic tape having an excellent durability.

This object in the second embodiment of the present invention can be achieved by a magnetic recording medium comprising a support, a magnetic layer, and a protective layer, wherein the protective layer described above is a carbon film and has a peak in a region of 1400 to 1600 cm$^{-1}$ in a Raman spectroscopic spectrum; and a ratio $I_B/I_G$ of a background intensity $I_B$ to a peak intensity $I_G$ in this peak is 1/1.2 to 1/1.8, that is, $I_G/I_B$ is 1.2 to 1.8.

In particular, the object of the present invention can be achieved by a magnetic recording medium comprising a support, a magnetic layer, and a protective layer, wherein the protective layer described above is a carbon film containing a fluorescent organic high polymer and has a peak in a region of 1400 to 1600 cm$^{-1}$ in a Raman spectrum; and a ratio $I_G/I_B$ of a peak intensity $I_G$ to a background intensity $I_B$ in this peak is 1.2 to 1.8.

In the second embodiment of the present invention, the ratio $I_G/I_B$ has been set to 1.2 to 1.8 because of the reasons that the ratio of less than 1.2 reduces the film hardness and makes the durability inferior and that in contrary to this, the ratio exceeding 1.8 makes the film fragile, which results in making the durability inferior. The ratio $I_G/I_B$ is more preferably 1.3 to 1.6.

A magnetic tape in which a protective layer comprising a carbon film having the structure described above is provided on a metal magnetic layer is rich in a rigidity, which results in having an excellent durability and running property.

Thus, according to the second embodiment of the present invention, the magnetic tape which is excellent in all of a still durability, a running property and an output can be obtained.

The preceding object in the third embodiment of the present invention can be achieved by a magnetic recording medium comprising a support, a magnetic layer, and a protective layer, wherein the protective layer described above is a carbon film and has a peak in a region of 1400 to 1600 cm$^{-1}$ in a Raman spectroscopic spectrum; and a ratio $I_B/I_G$ of a background intensity $I_B$ to a peak intensity $I_G$ in this peak is 0.56 or more and less than 1.0.

In particular, the object of the present invention can be achieved by a magnetic recording medium comprising a support, a magnetic layer, and a protective layer, wherein the protective layer described above is a carbon film containing a fluorescent organic high polymer and has a peak in a region of 1400 to 1600 cm$^{-1}$ in a Raman spectroscopic spectrum; and a ratio $I_B/I_G$ of a background intensity $I_B$ to a peak intensity $I_G$ in this peak is 0.56 or more and less than 1.0.

In the third embodiment of the present invention, the ratio $I_B/I_G$ has been set to 0.56 or more and less than 1.0 because of the reasons that the ratio exceeding 1.0 reduces the film hardness and makes the durability inferior and that in contrary to this, the ratio of less than 0.56 makes the film fragile, which results in making the durability inferior. The ratio $I_B/I_G$ is preferably 0.69 to 0.94 (particularly 0.69<$I_B$/$I_G$<0.94), more preferably 0.79≦$I_B/I_G$≦0.86.

The protective layer described above is preferably formed by ECR-CVD using hydrocarbon series compounds having unsaturated bonds. For example, the protective layer is preferably formed by the ECR-CVD using chain unsaturated hydrocarbons having double bonds and triple bonds, such as ethylene and acetylene, cyclic unsaturated hydrocarbons (aromatic hydrocarbons) such as benzene, toluene, benzoic acid, and benzaldehyde, naphthalene, and anthracene, which are diluted in benzene and toluene.

In the case where the protective layer is formed by the ECR-CVD, hydrocarbon series compounds are supplied so that the vacuum degree is 2×10$^{-4}$ to 5×10$^{-2}$ Torr, and the protective layer is preferably formed by the ECR-CVD under this atmosphere.

A magnetic tape in which a protective layer comprising a carbon film having the structure described above is provided on a metal magnetic layer is rich in a rigidity, which results in having an excellent durability and running property.

A lubricant is provided, if necessary, on the protective layer formed on the magnetic layer.

Thus, according to the third embodiment of the present invention, the magnetic recording medium which is excellent in all of a still durability, a running property and an output can be obtained.

Further, an object of the fourth embodiment of the present invention is to provide a magnetic recording medium having a protective layer which does not have the problems described above.

That is, the present inventors have investigated in order to solve the problems described above. As a result thereof, it has been found that an elasticity of a protective layer is improved by incorporating a fluorescent organic high polymer having a high molecular weight into the protective layer in a suitable amount and that the head touch is improved. Further, it has been found that a degree of a content of this high molecular weight fluorescent organic high polymer can suitably controlled by regulating a gradient of a Raman spectrum. Thus, the magnetic recording medium provided according to the fourth embodiment of the present invention comprises a support, a magnetic layer formed on the support, and a protective layer formed on the magnetic layer, wherein a Raman spectrum in the protective layer satisfies a relation in which a gradient $a=(I_{2000}-I_{800})/(2000-800)$ between an intensity ($I_{800}$) in 800 cm$^{-1}$ and an intensity ($I_{2000}$) in 2000 cm$^{-1}$ is a≧1.0 after carrying out a blank correction.

It has been found that hydrocarbon molecules which contain hydrogens and are polymerized as well as carbon atoms participating in diamond bonds and graphite bonds are present in a DLC thin film. That is, polymerized hydrocarbon molecules (fluorescent organic molecules) as well as ones having an amorphous structure are present in the DLC thin film at random, and the characteristics of the DLC thin film is influenced by an amount of such fluorescent organic molecules present therein. It means the suitable presence of the high molecular weight fluorescent organic high polymers giving oscillation in a high frequency region that the gradient in the Raman spectrum is 1 or more as described above. These high molecular weight fluorescent organic high polymers are considered to make it possible to make up for defects present in a thin film and have a suitable flexibility as well. Incidentally, the protective layer is not restricted to a carbon thin film as long as it contains a high molecular weight fluorescent organic high polymer providing a suitable elasticity, and it may be, for example, a film of a semiconductor such as Si, Ge and Sn, a film of a semiconductor oxide such as $SiO_2$ and others, and a protective layer containing other molecules such as Si—C and F—C. However, for a convenience of explanation, DLC shall primarily be given as an example in the present specification.

In the fourth embodiment of the present invention, the Raman spectrum of the protective layer obtained after finishing a blank correction is used. The blank correction is carried out by deducting a spectrum measured without setting a sample in a Raman spectrometer from a spectrum obtained by actually setting the sample. This is to remove noise components brought about by stray light and others such as a laser ray which is irregularly reflected on a sample surface to obtain a net Raman spectrum which does not depend on a kind and a sensitivity of the spectrometer. The example is shown in FIGS. 4A and 4B. FIG. 4A shows both of a Raman spectrum before correction and a blank level. A net Raman spectrum as shown in FIG. 4B can be obtained by deducting the blank level from the Raman spectrum before this correction.

After carrying out the blank correction in such manner as described above, a gradient coefficient a is obtained from the following equation using two points of a spectral intensity $(I_{800})$ in 800 $cm^{-1}$ and a spectral intensity $(I_{2000})$ in 2000 $cm^{-1}$ which is apart by 1200 $cm^{-1}$ from it:

$$a(\text{count} \cdot \text{cm/sec}) = \frac{I_{2000} - I_{800}(\text{count/sec})}{2000 - 800(\text{cm}^{-1})}$$

In the fourth embodiment of the present invention, the coefficient a obtained in the protective layer satisfies a relation of $a \geq 1.0$.

Thus, according to the fourth embodiment of the present invention, the magnetic recording medium having excellent head touch can be obtained. This magnetic recording medium can solve conventional inconveniences by having the protective layer containing the high molecular weight fluorescent organic high polymer and possessing a suitable elasticity as well as a hardness.

BRIEF DESCRIPTION OF THE DRAWINGS

First Embodiment:

FIG. 1A is a chart showing the results obtained by the Raman spectroscopic analysis of the protective layers in the magnetic recording media obtained in Example 1-1 and Comparative Example 1-1.

Figure 2A:
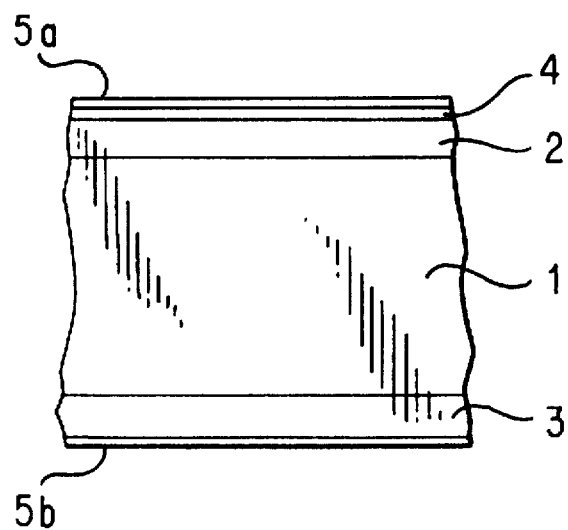
Figure 2B:
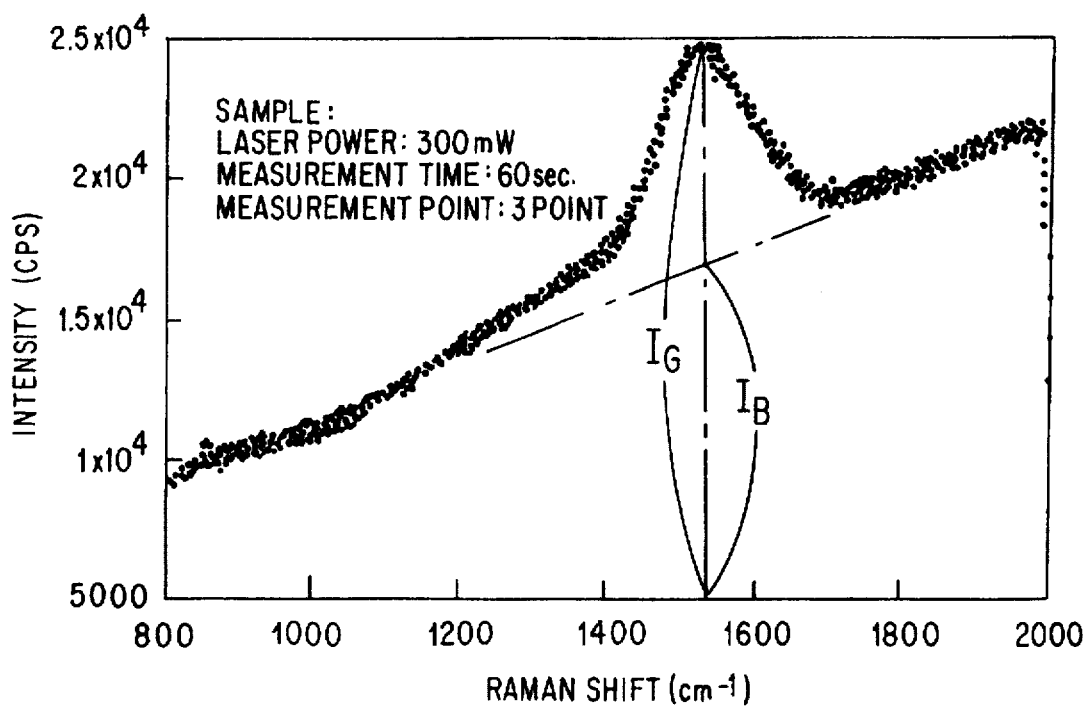
Figure 2C:
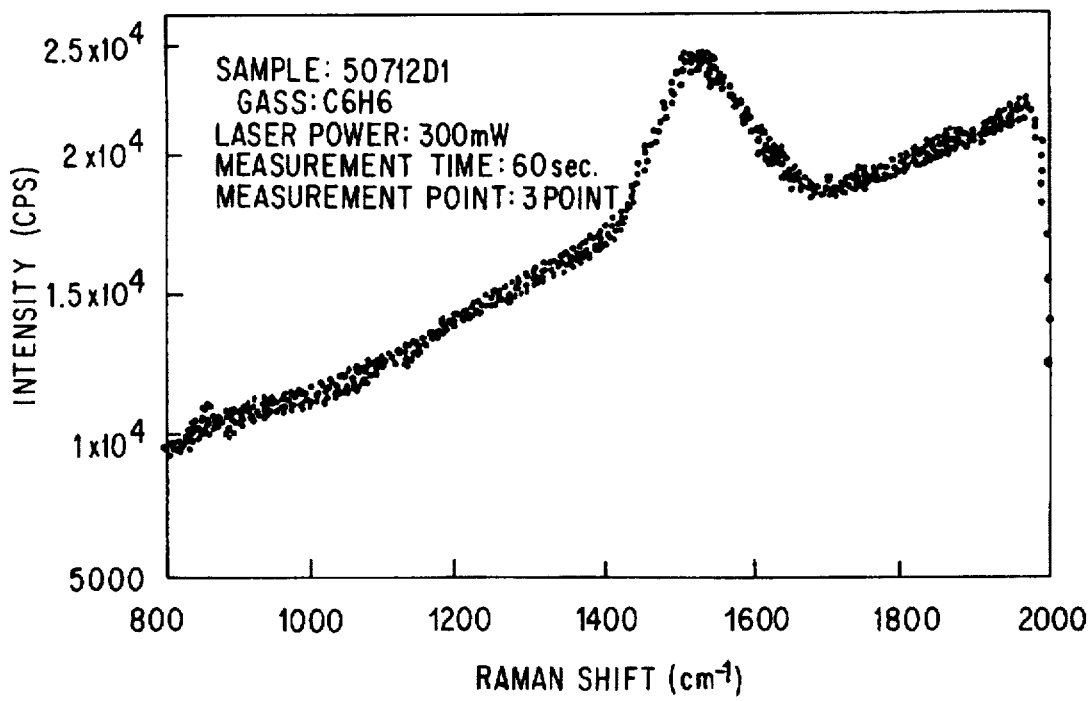
Figure 2D:
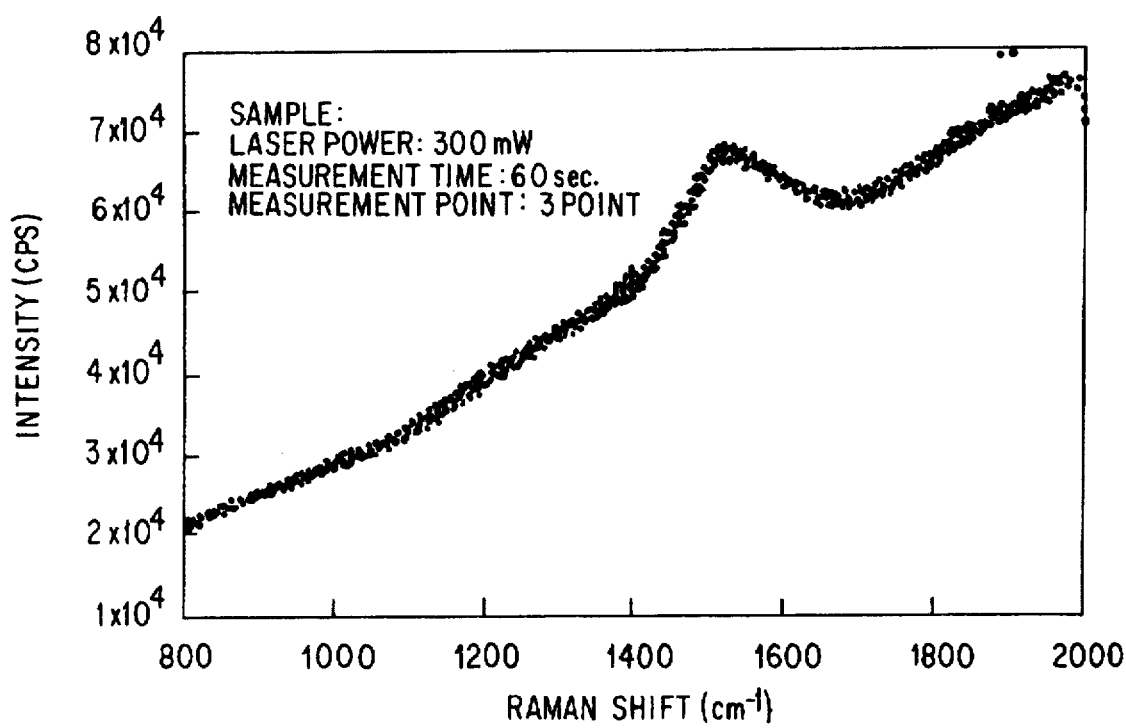
Figure 2E:
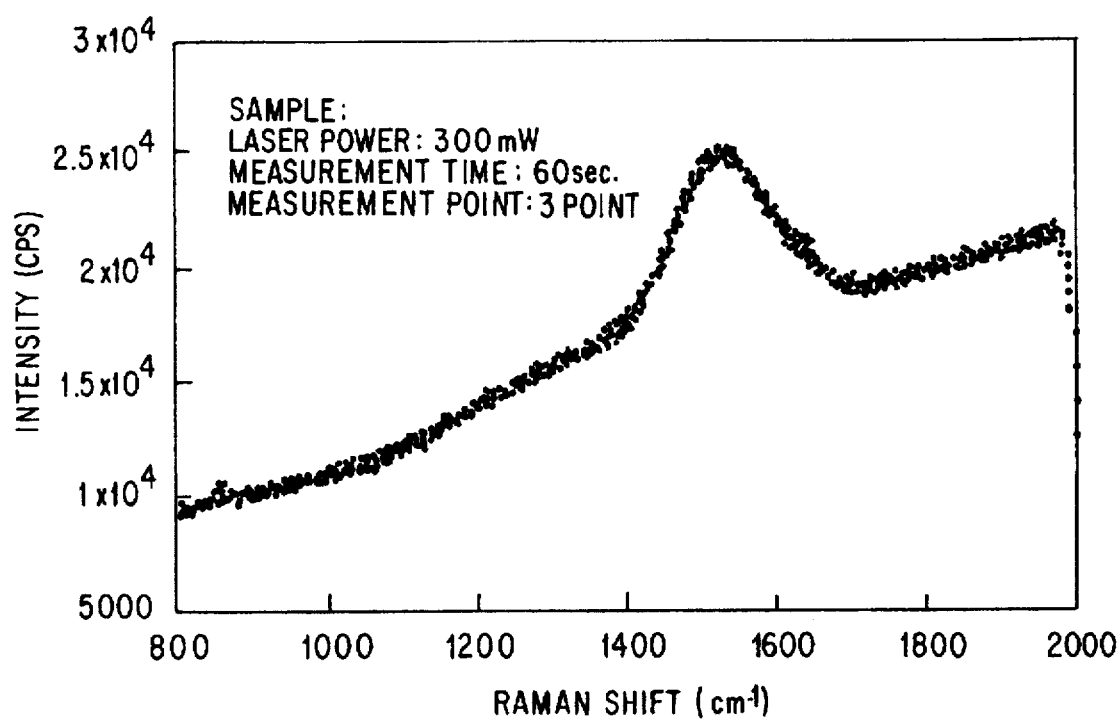
Figure 2F:
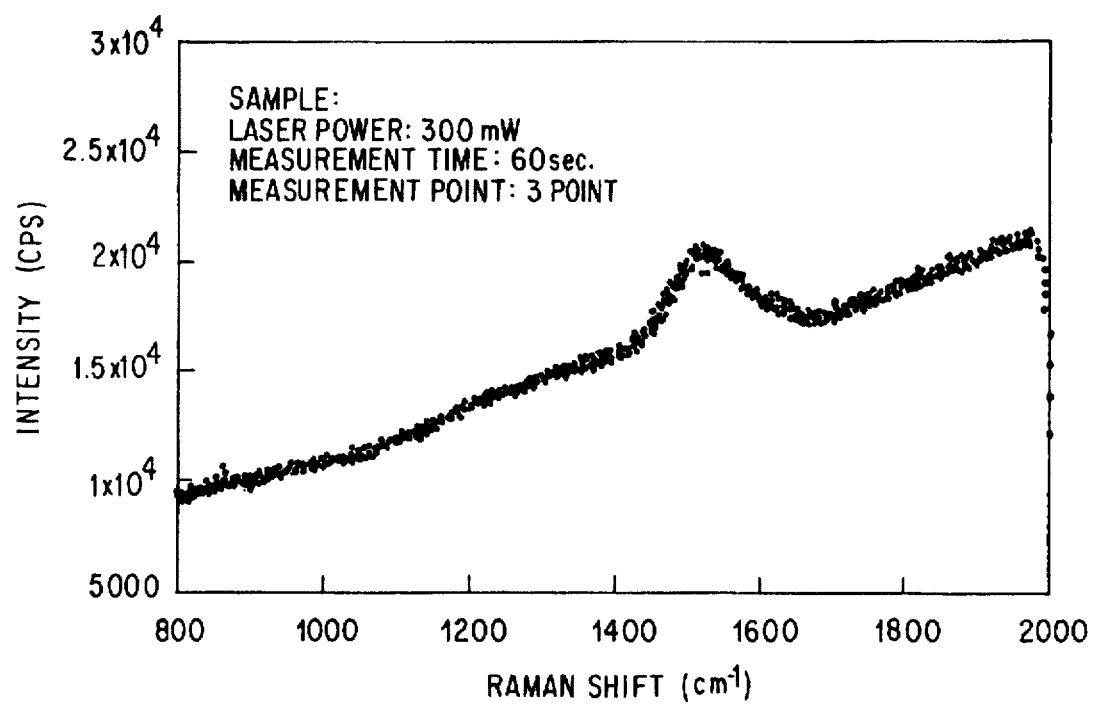
Figure 2G:
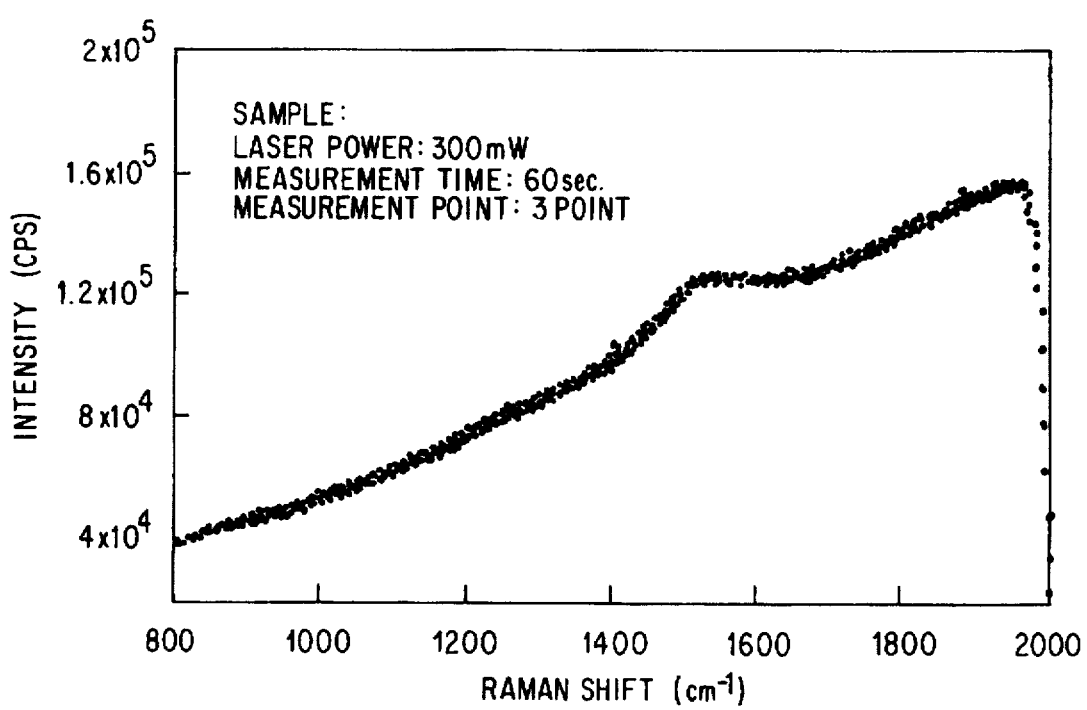
Figure 2H:
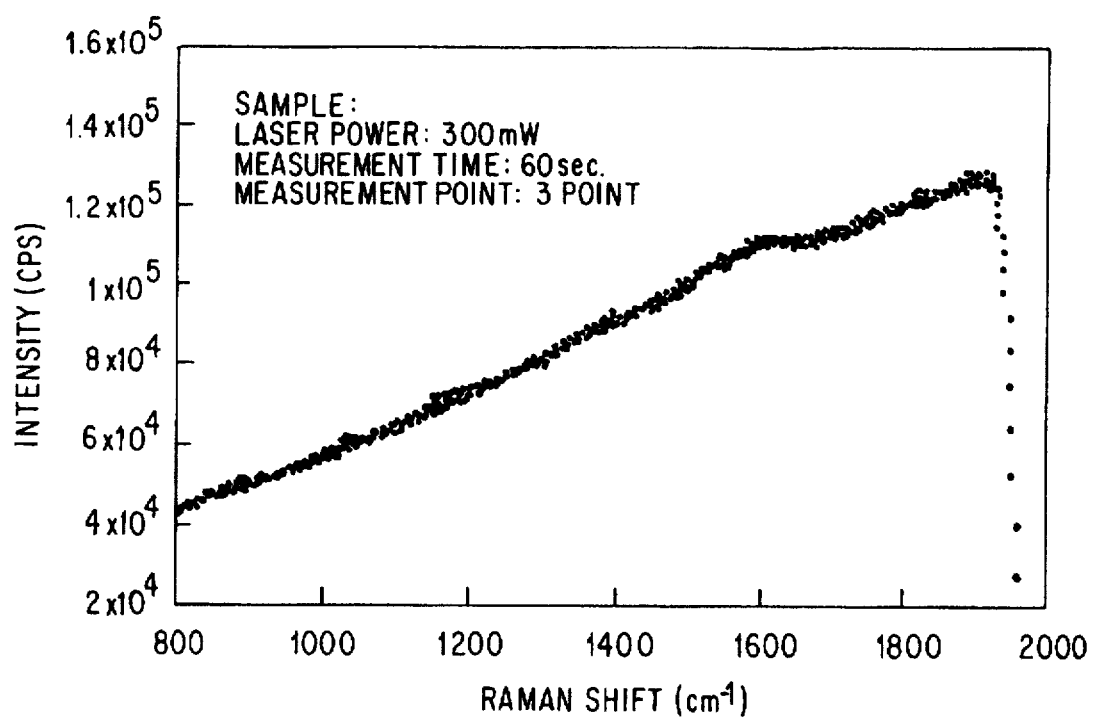
Figure 2I:
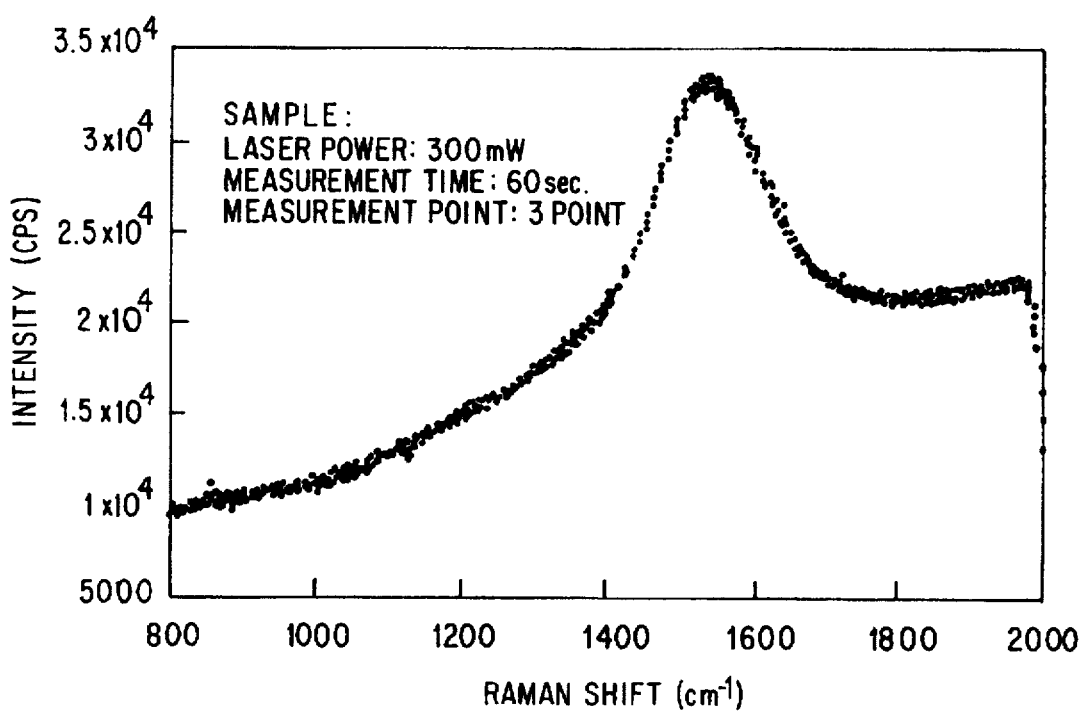

Second Embodiment:

FIG. 2A is a schematic diagram of the magnetic tape prepared according to the second embodiment of the present invention. FIG. 2B is a Raman spectroscopic spectrum of the protective layer in the magnetic tape prepared in Example 2-1. FIG. 2C is a Raman spectroscopic spectrum of the protective layer in the magnetic tape prepared in Example 2-2. FIG. 2D is a Raman spectroscopic spectrum of the protective layer in the magnetic tape prepared in Example 2-3. FIG. 2E is a Raman spectroscopic spectrum of the protective layer in the magnetic tape prepared in Example 2-4. FIG. 2F is a Raman spectroscopic spectrum of the protective layer in the magnetic tape prepared in Example 2-5. FIG. 2G is a Raman spectroscopic spectrum of the protective layer in the magnetic tape prepared in Comparative Example 2-1. FIG. 2H is a Raman spectroscopic spectrum of the protective layer in the magnetic tape prepared in Comparative Example 2-2. FIG. 2I is a Raman spectroscopic spectrum of the protective layer in the magnetic tape prepared in Comparative Example 2-3.

The signals represent the following: 1: support, 2: Co metal magnetic film, 3: Al—Cu alloy film, and 4: diamond-like carbon film (protective layer).

Figure 3A:
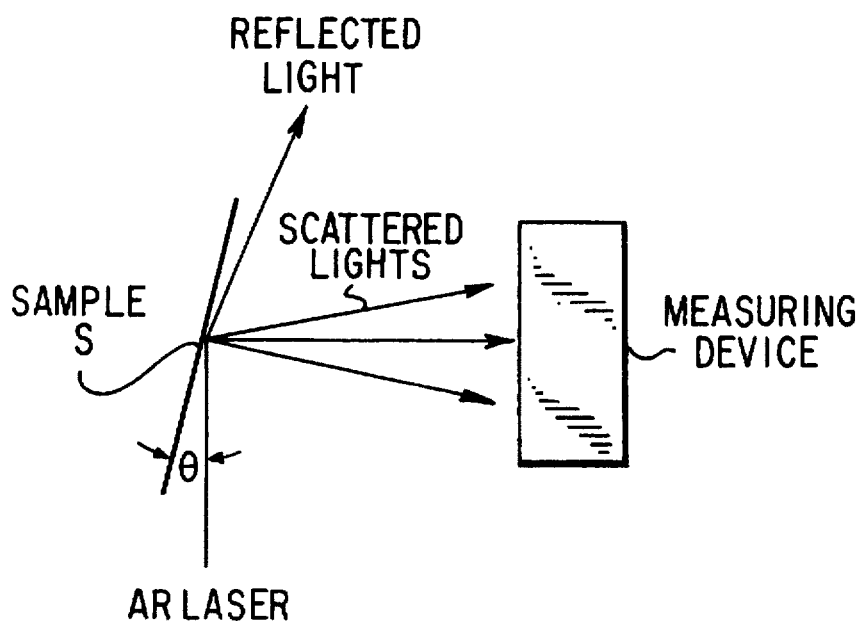
Figure 3B:
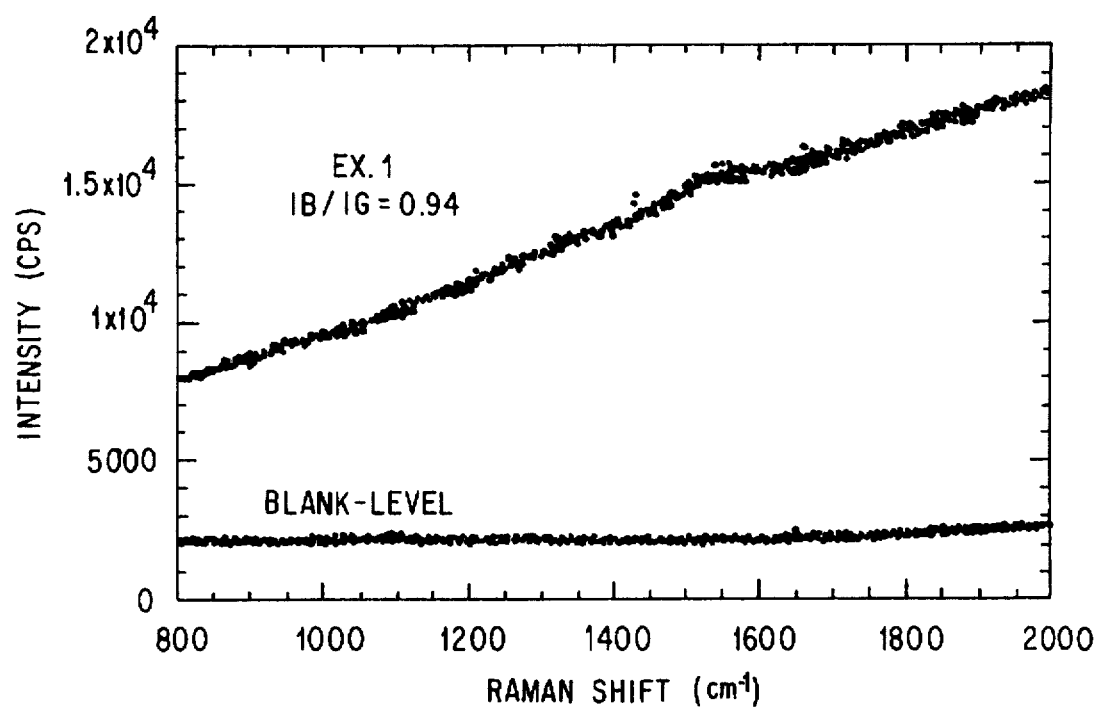
Figure 3C:
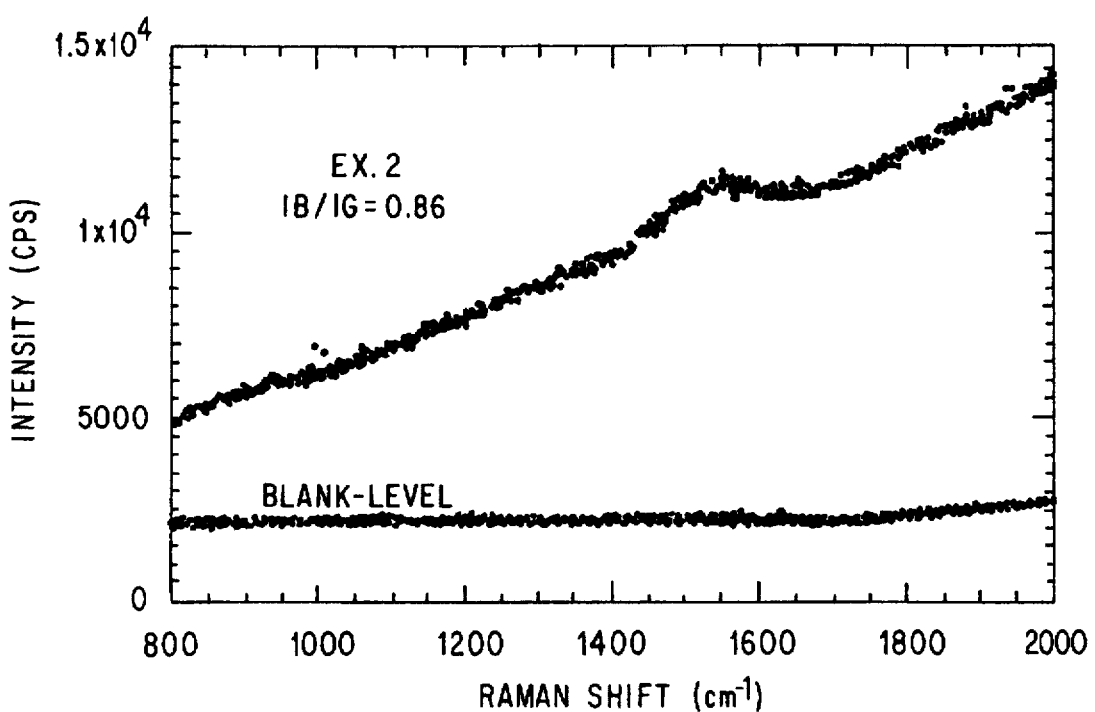
Figure 3D:
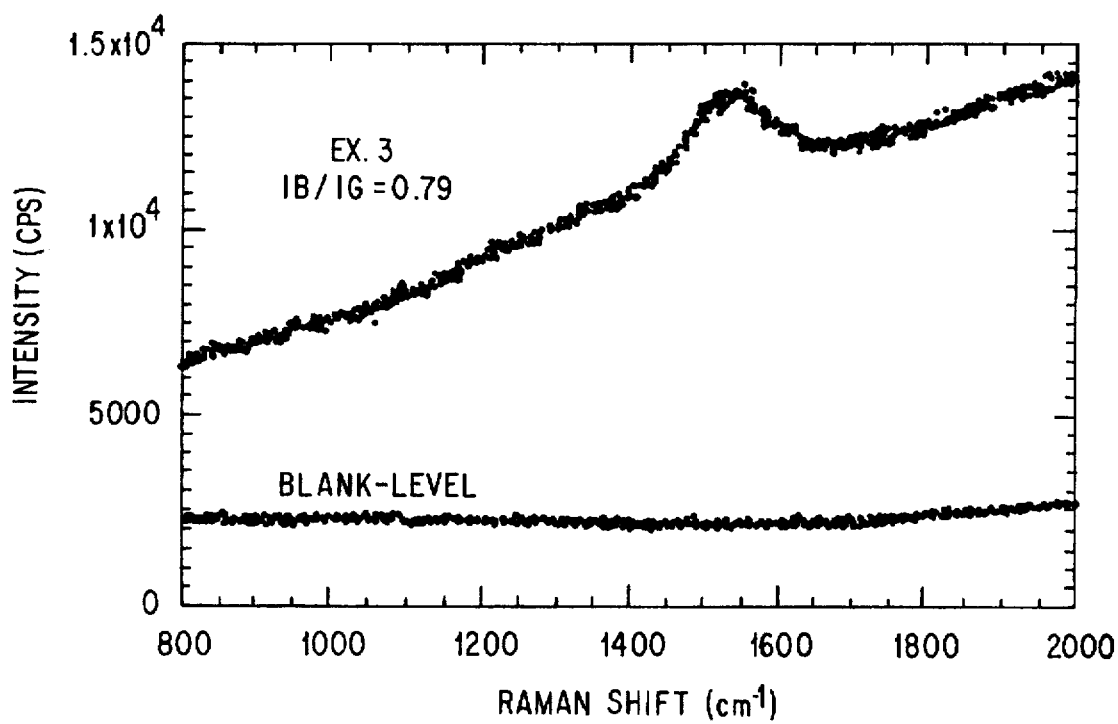
Figure 3E:
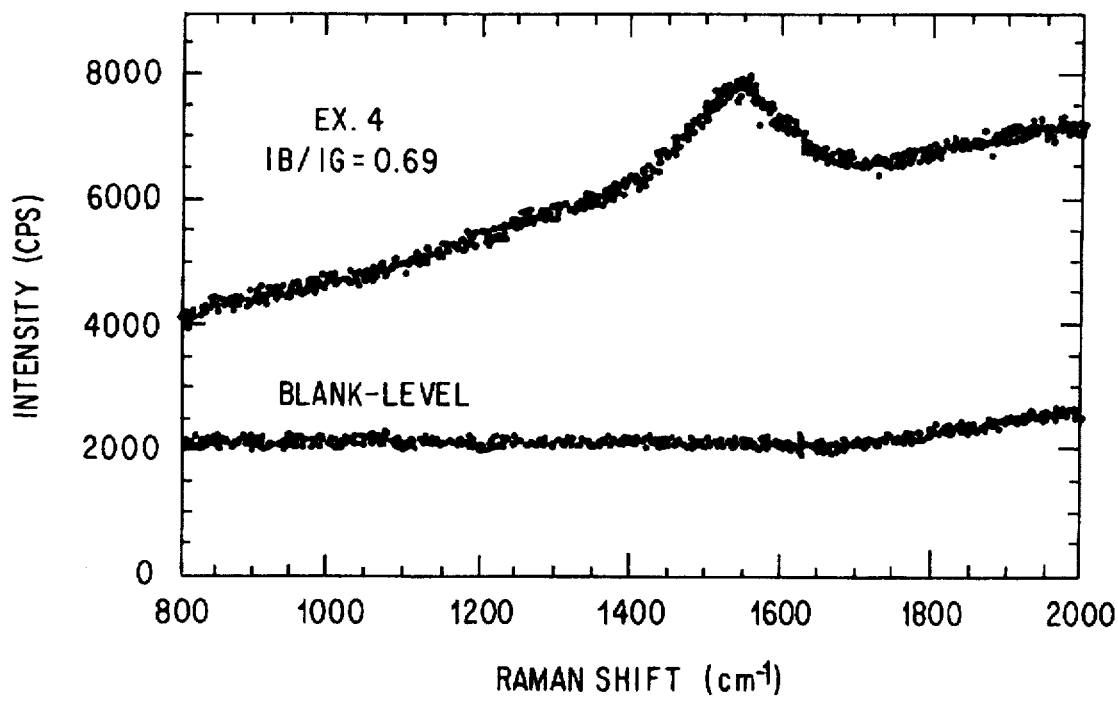
Figure 3F:
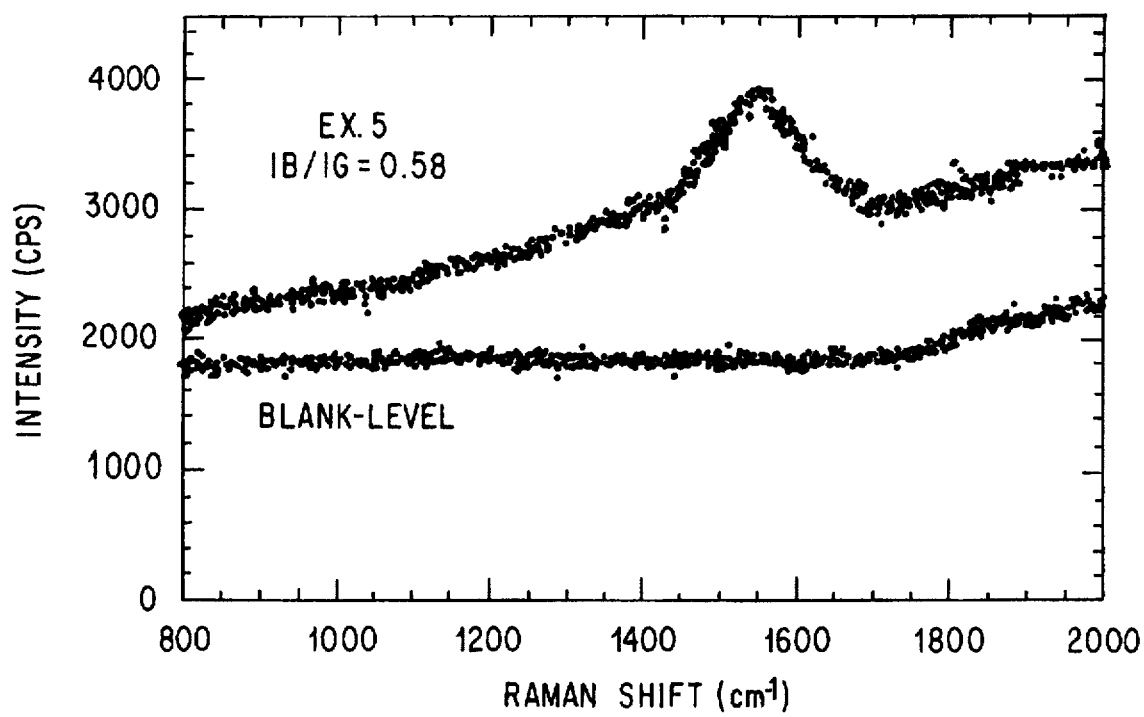
Figure 3G:
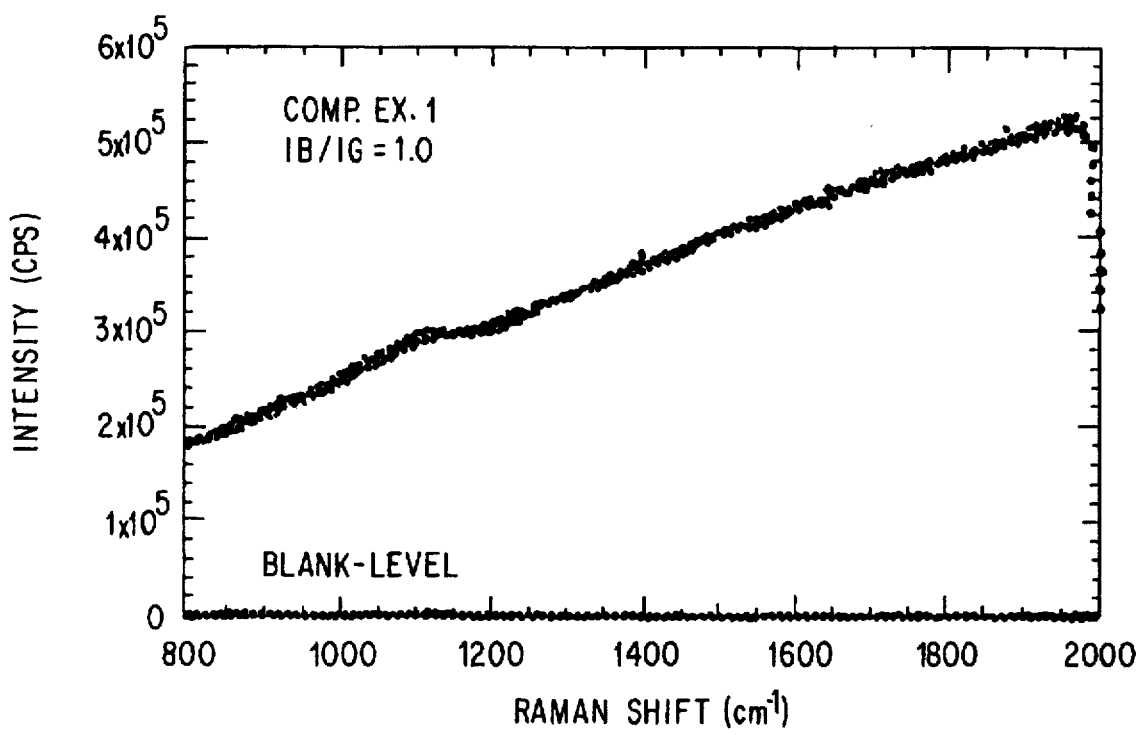
Figure 3H:
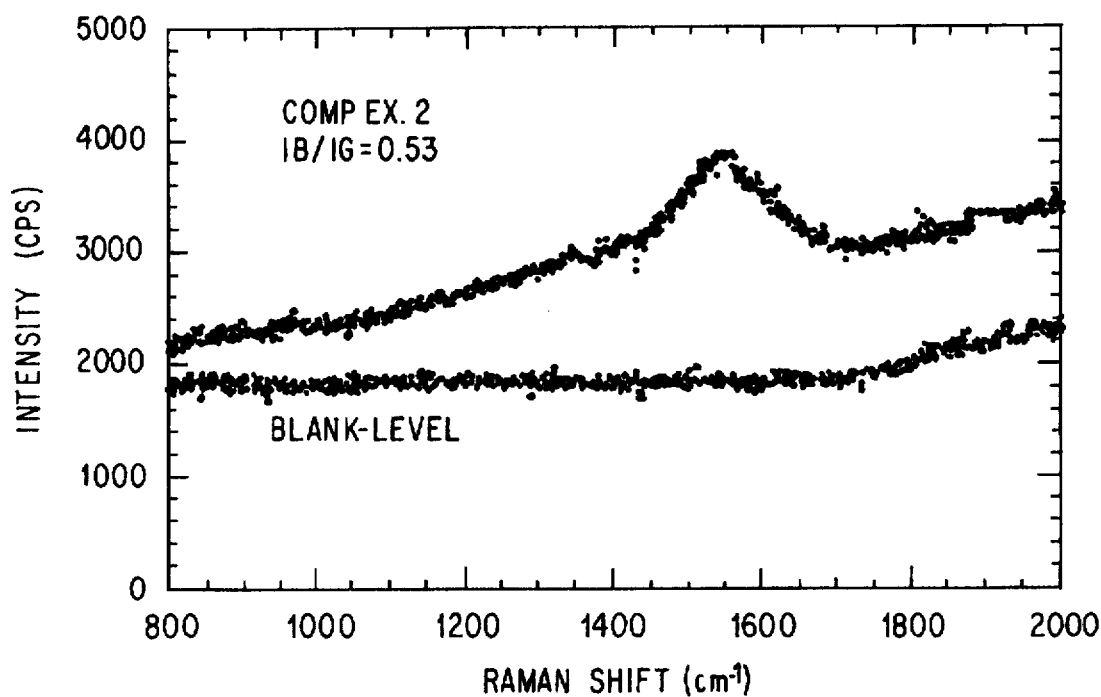
Figure 3I:
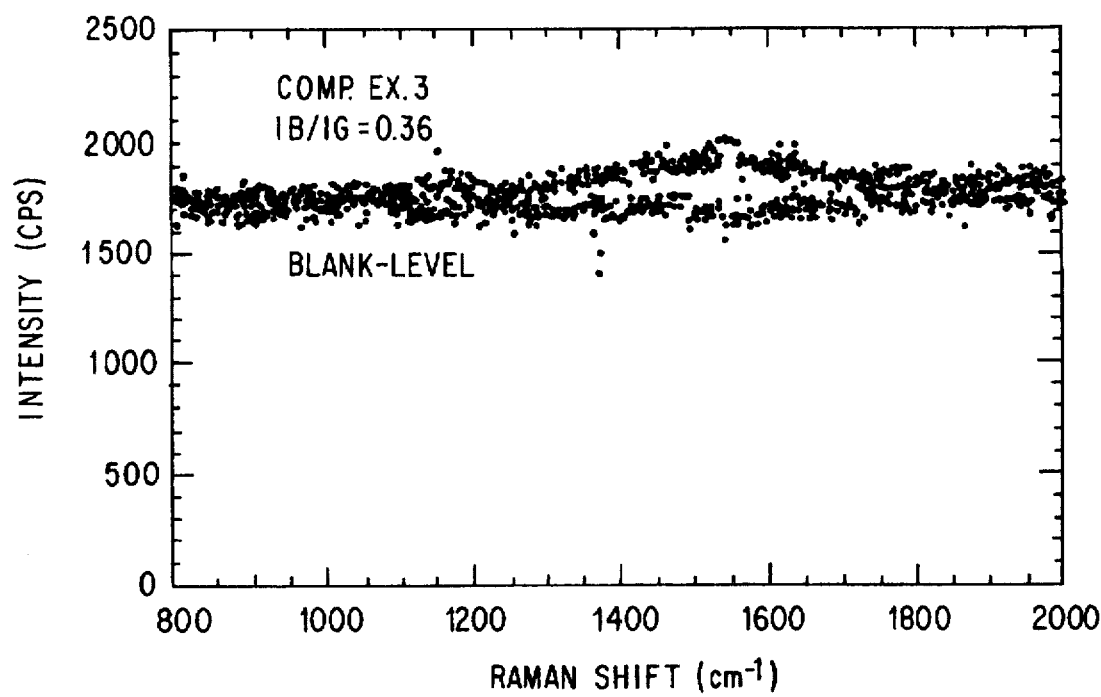

Third Embodiment:

FIG. 3A is an explanatory diagram on how to determine the background intensity $I_B$ and the peak intensity $I_G$. FIG. 3 is a schematic diagram of the magnetic tape prepared according to the third embodiment of the present invention. FIG. 3B is a Raman spectroscopic spectrum of the protective layer in the magnetic tape prepared in Example 3-1. FIG. 3C is a Raman spectroscopic spectrum of the protective layer in the magnetic tape prepared in Example 3-2. FIG. 3D is a Raman spectroscopic spectrum of the protective layer in the magnetic tape prepared in Example 3-3. FIG. 3E is a Raman spectroscopic spectrum of the protective layer in the magnetic tape prepared in Example 3-4. FIG. 3F is a Raman spectroscopic spectrum of the protective layer in the magnetic tape prepared in Example 3-5. FIG. 3G is a Raman spectroscopic spectrum of the protective layer in the magnetic tape prepared in Comparative Example 3-1. FIG. 3H is a Raman spectroscopic spectrum of the protective layer in the magnetic tape prepared in Comparative Example 3-2. FIG. 3I is a Raman spectroscopic spectrum of the protective layer in the magnetic tape prepared in Comparative Example 3-3.

The signals represent the following: 1: support, 2: Co metal magnetic film, 3: Al—Cu alloy film, and 4: diamond-like carbon film (protective layer).

Figure 4A:
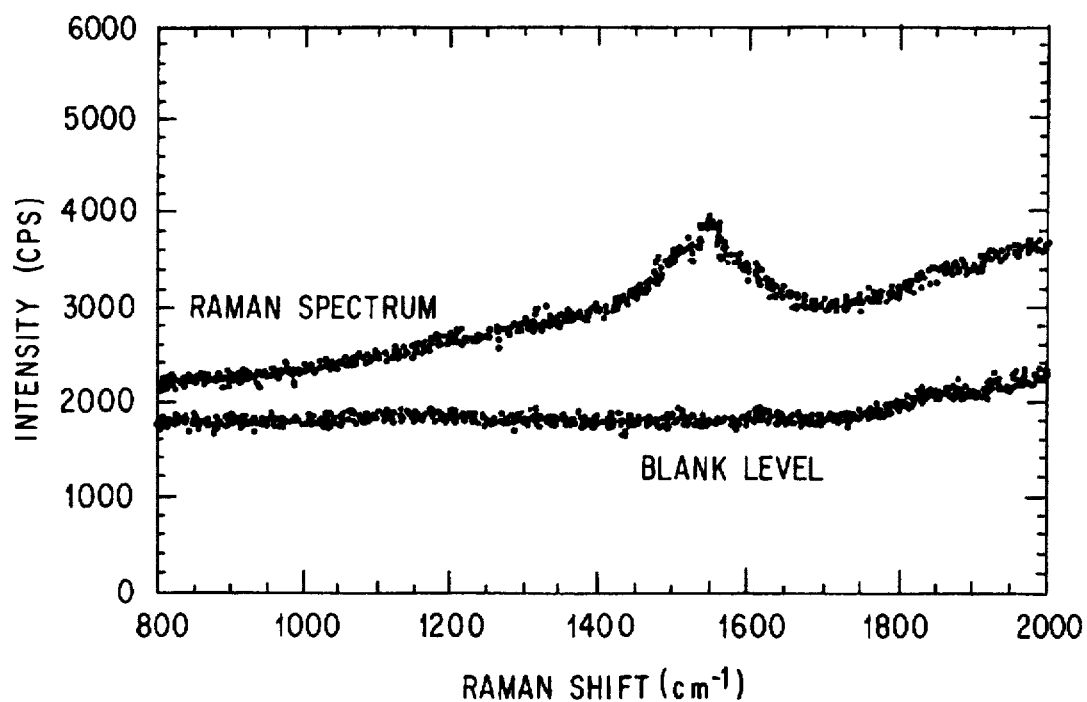
Figure 4B:
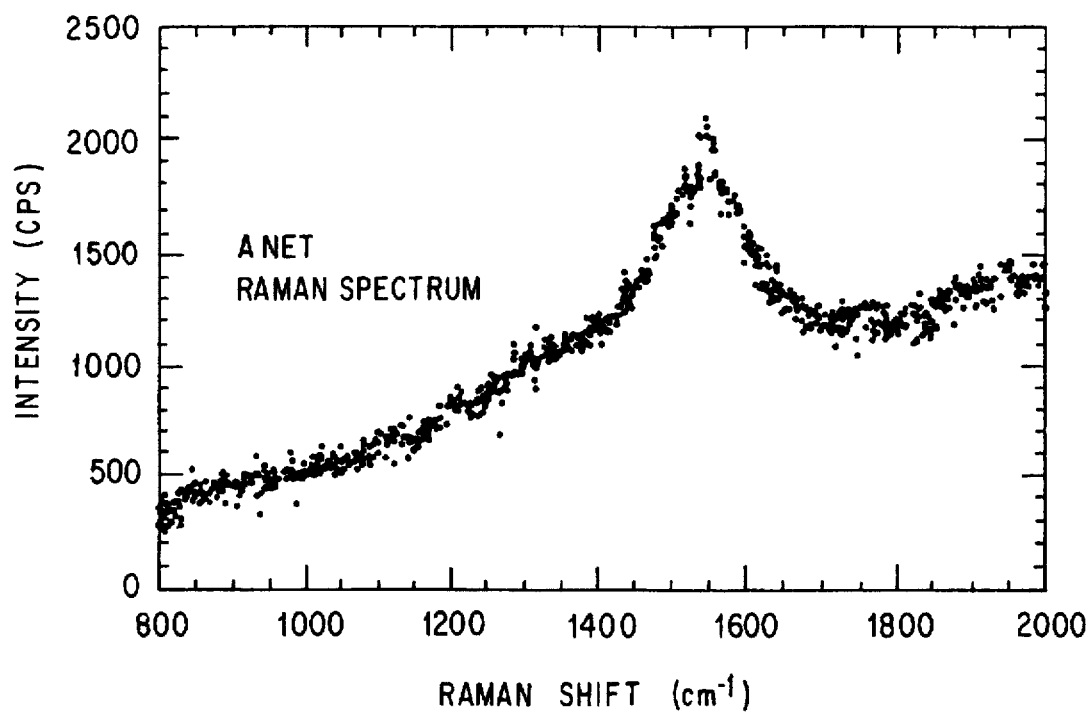
Figure 4C:
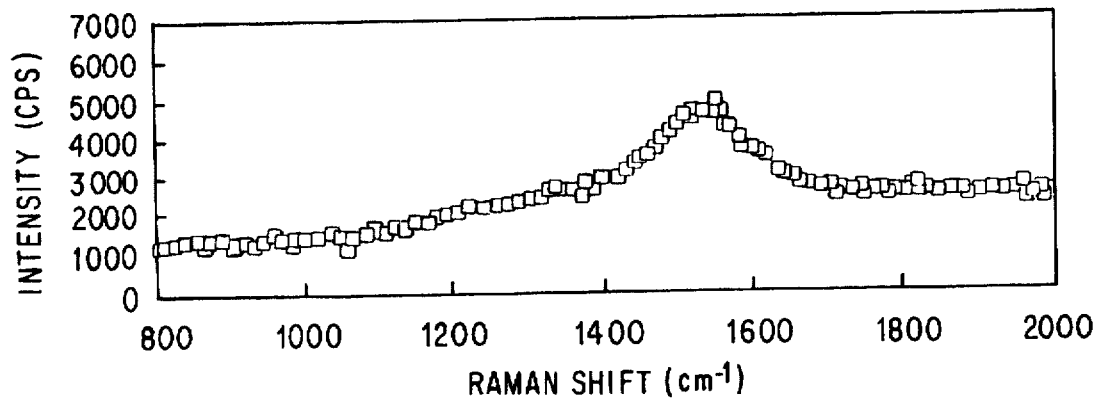
Figure 4D:
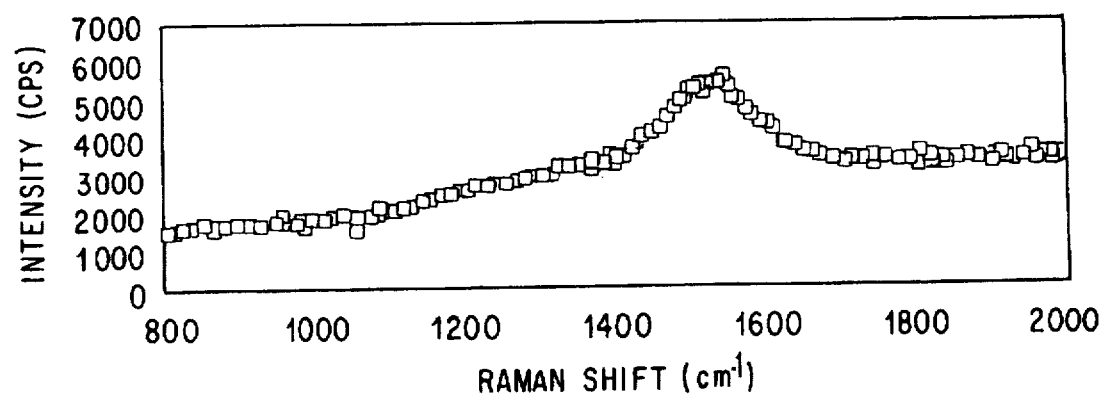
Figure 4E:
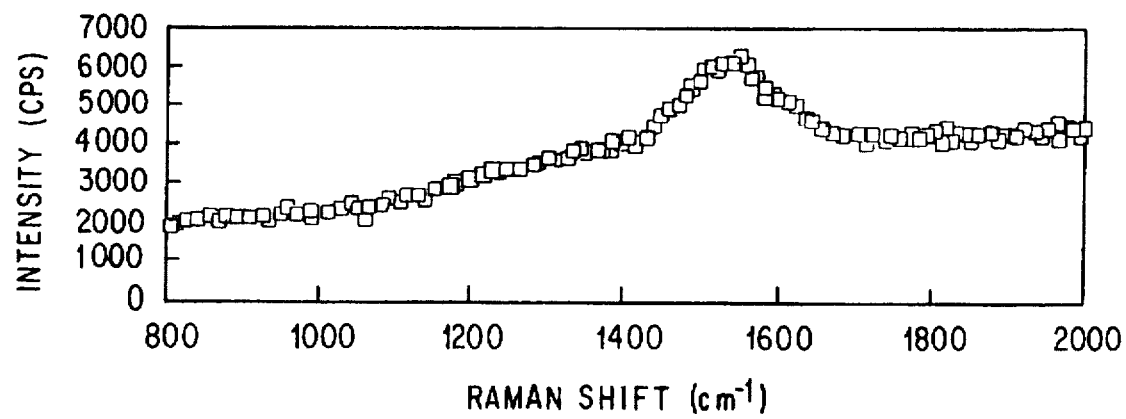
Figure 4F:
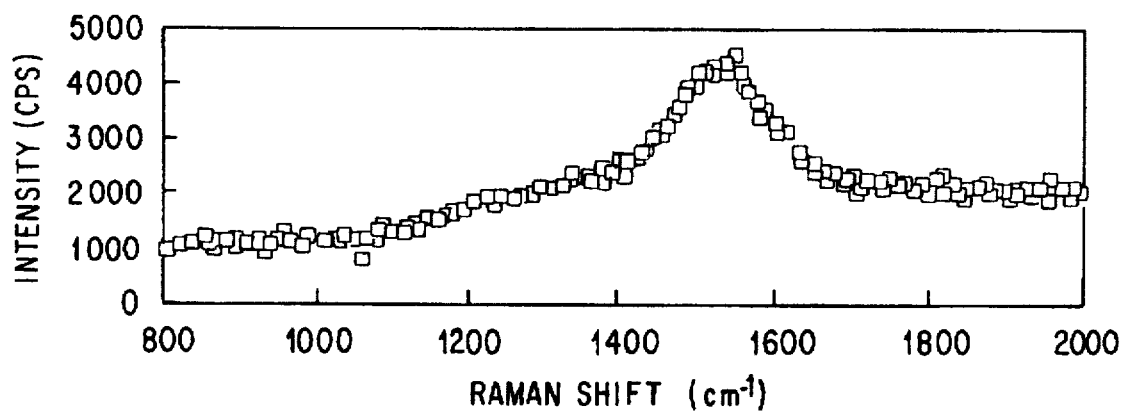
Figure 4G:
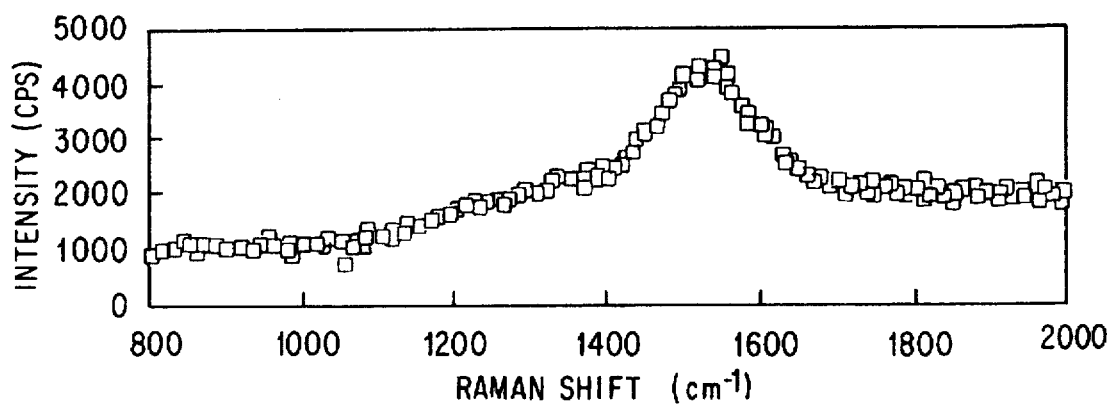
Figure 4H:
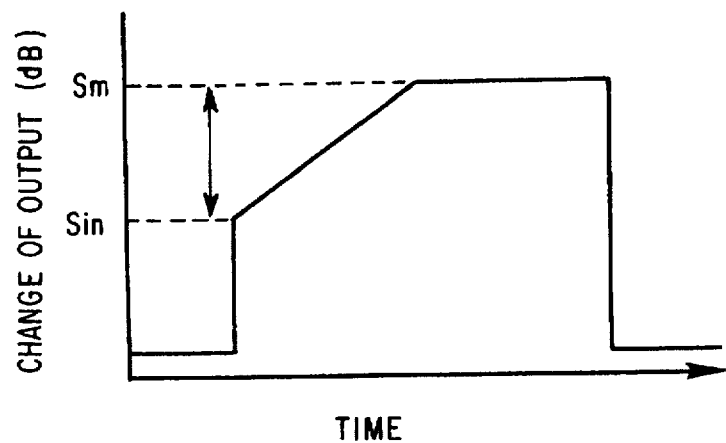

Fourth Embodiment:

FIGS. 4A and 4B are graphs for explaining the blank correction of the Raman spectrum, wherein (4A) shows the spectrum before correction and a blank level, and (4B) shows a net spectrum obtained by deducting the blank level. FIG. 4C is a Raman spectrum of the protective layer obtained in Example 4-1. FIG. 4D is a Raman spectrum of the protective layer obtained in Example 4-2. FIG. 4E is a Raman spectrum of the protective layer obtained in Example 4-3. FIG. 4F is a Raman spectrum of the protective layer obtained in Comparative Example 4-1. FIG. 4G is a Raman spectrum of the protective layer obtained in Comparative Example 4-2. FIG. 4H is a schematic diagram for explaining the definition of a front output break ratio of an envelope.

EXAMPLES

The examples of the present invention shall be explained below. However, the present invention shall not be restricted to these examples.

First Embodiment: Examples 1-1 and 1-2 and Comparative Example 1-1

First, cobalt was deposited on a PET film having a thickness of 6.5 μm to form magnetic layer having a thickness of 2000 Å. Then, a protective layer comprising a diamond-like carbon thin film was formed on the magnetic layer by means of an ordinary ECR plasma CVD apparatus. The conditions therefor, the thicknesses of the protective layers, and the ratios of the intensities ($C_{2000}$) in 2000 cm$^{-1}$ to the intensities ($C_{1000}$) in 1000 cm$^{-1}$ determined by the Raman spectroscopic analysis are shown in Table 1-1.

TABLE 1-1

|  | Comparative Example 1-1 | Example 1-1 | Example 1-2 |
|---|---|---|---|
| Microwave power | 600 W | 600 W | 600 W |
| Microwave frequency | 2.45 GHz | 2.45 GHz | 2.45 GHz |
| Film-forming speed | 3 m/minute | 3 m/minute | 3 m/minute |
| Feed gas & flow amount | CH$_4$ 2 SCCM + H$_2$ 98 SCCM | Benzene 50 SCCM | Acetylene 30 SCCM |
| Vacuum degree in chamber | 4.3 mm Torr | 4.3 mm Torr | 4.3 mm Torr |
| Film thickness | 80 | 110 | 100 |
| Intensity ratio ($C_{2000}/C_{1000}$) | 1.14 | 2.55 | 1.96 |

A back coat layer comprising carbon black as a principal component and having a thickness of 0.5 μm was formed by gravure coating on a face opposite to a face of the PET film on which the magnetic layer and the diamond-like carbon layer were formed in the manners described above. Further, a lubricant layer comprising a fluorine series lubricant (FOMBLIN Z DIAC, modifiedcarboxyl group, manufactured by Monte Catini Co., Ltd.) was formed on the diamond-like carbon layer by gravure coating. The film thus obtained was slit to a 8 mm width and loaded into a 8 mm VTR cassette to prepare a 8 mm video tape. The results of the Raman spectroscopic analysis of the respective diamond-like carbon thin films are shown in FIG. 1A.

<Performance evaluation>

The 8 mm video tape prepared above was evaluated for a corrosion resistance, a change in a friction coefficient, and a generation of cupping by the following methods. The results thereof are shown in Table 1-2.

① Corrosion resistance:

A reduction rate ΔBs (%) in a saturated flux density was determined after the 8 mm video tape was stored for one week under the conditions of 60° C. and 90% RH.

② Friction coefficient:

A value obtained when a tension of 20 g was applied to the tape at a holding angle of 115° to a friction body (diameter: 5 mm, made of stainless steel, and surface roughness: 0.2 S) at a rate of 14.3 mm/second under the conditions of 20° C./50% (temperature/humidity) was determined by means of a friction coefficient measuring apparatus. The friction coefficients (μ) were measured after one pass, 100 passes and 1000 passes, respectively.

Figure 1B:
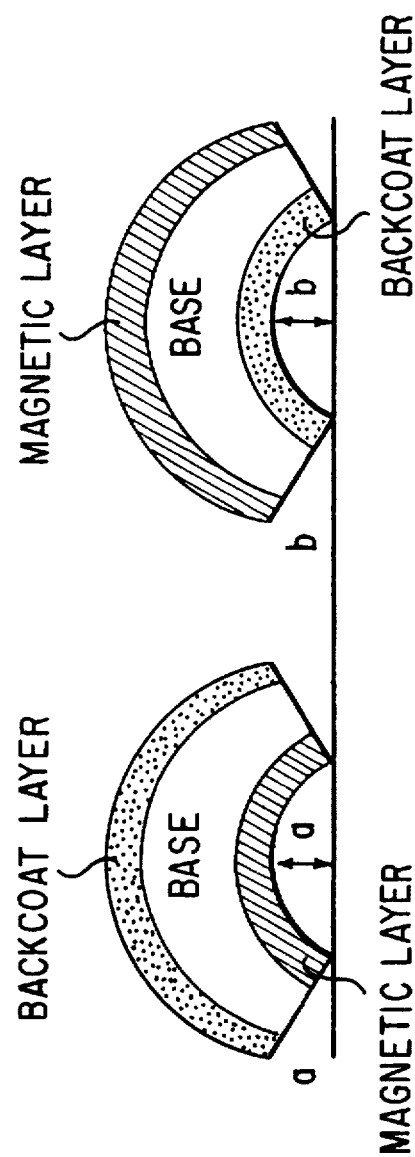
FIG. 1B is a schematic diagram showing a cupping determination in the examples.

③ Generation of cupping:

With respect to a cupping amount, cupping caused on a magnetic layer side after leaving for standing for one hour immediately after slitting was represented by −a (μm) [FIG. 1B (left)], and cupping caused on a back coat layer side was represented by +b (μm) [FIG. 1B (right)].

TABLE 1-2

|  |  | Comparative Example 1-1 | Example 1-1 | Example 1-2 |
|---|---|---|---|---|
| Corrosion resistance |  | 13% | 7% | 9% |
| Friction coefficient | 1 pass | 0.17 | 0.18 | 0.18 |
|  | 100 pass | 0.22 | 0.20 | 0.20 |
|  | 1000 pass | 0.35 | 0.25 | 0.28 |
| Cupping amount |  | −600 μm | −230 μm | −390 μm |

Figure 1C:
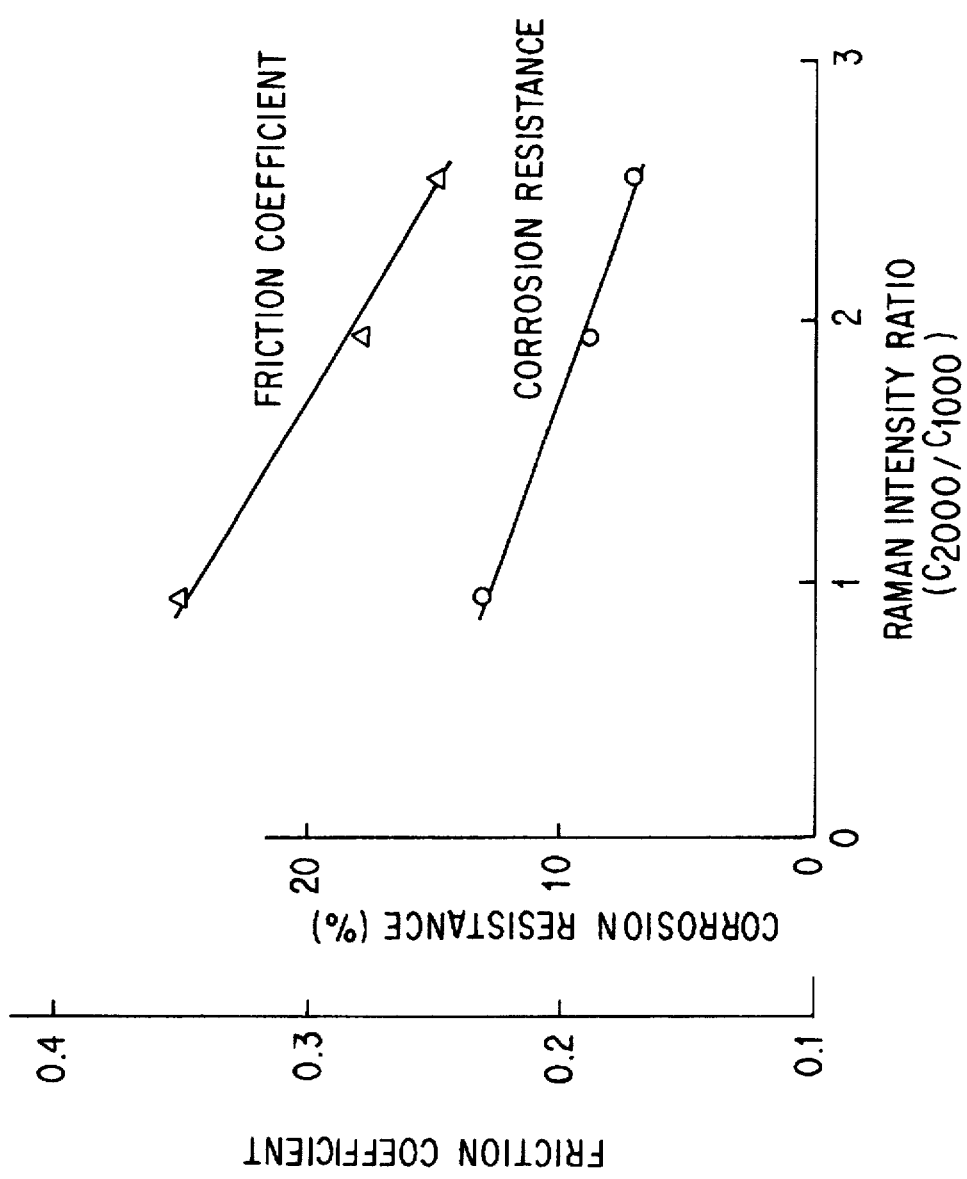
FIG. 1C is a graph showing a correlation of the Raman intensity ratio $(C_{2000}/C_{1000})$ with the corrosion resistance and the friction coefficient.

A correlation of the Raman intensity ratio ($C_{2000}/C_{1000}$) with the corrosion resistance and the friction coefficient is shown in FIG. 1-3. It can be found that the Raman intensity ratio ($C_{2000}/C_{1000}$) of 1.8 or more is required to the conditions that the friction coefficient is 0.3 or lower and the corrosion resistance is 10% or lower.

Second Embodiment:

The support used for the magnetic recording medium prepared according to the second embodiment of the present invention may be magnetic or non-magnetic. In general, it is non-magnetic. For example, flexible polymer materials including polyester such as PET, polyamide, polyimide, polysulfone, polycarbonate, olefin series resins such as polypropylene, cellulose series resins, and vinyl chloride series resins are used.

A magnetic layer of a metal thin film type is provided on this flexible support in a thickness of 500 to 5000 Å by means of dry plating such as vapor deposition and sputtering. Materials for magnetic particles which are used for forming the magnetic layer of a metal thin film type include, for example, Co—Ni alloy, Co—Pt alloy, Co—Ni—Pt alloy, Fe—Co alloy, Fe—Ni alloy, Fe—Co—Ni alloy, Fe—Co—B alloy, Co—Ni—Fe—B alloy, Co—Cr alloy, and alloys prepared by incorporating different kinds of metals into these alloys, as well as metals such as Fe, Co and Ni. The materials for forming the magnetic layer of a metal thin film type include as well nitrides (for example, Fe—N and Fe—N—O) and carbides (for example, Fe—C and Fe—C—O) of the materials described above.

A protective layer having a thickness of 10 to 500 Å, particularly 30 to 200 Å is provided on this metal magnetic layer. This protective layer has the characteristics described above. Such protective layer can be formed by means of an ECR microwave plasma CVD apparatus. It is important to control conditions to feed gas (reaction gas) as follows. That is, hydrocarbon series gas such as methane, ethylene, acetylene, and benzene is fed into a plasma reaction tube, wherein oxygen is fed as well so that C and H contained in a reaction gas system are controlled by a reaction between hydrocarbon and oxygen to satisfy a relation of C/H>1, that is, an H amount is reduced relatively to a C amount. That is, in forming the film, attention has to be paid to a blend ratio of oxygen to hydrocarbons. ECR microwave plasma CVD is carried out under the conditions described above to form a carbon series, particularly diamond-like carbon protective layer having the characteristics described above.

After forming the metal magnetic layer and the protective layer in the manners described above, a fluorine series lubricant layer is provided in a thickness of 20 to 70 Å by means of dipping or supersonic spraying. The lubricant includes, for example, carboxyl group-modified perfluoropolyethers, such as HOOC—CF$_2$—(O—C$_2$F$_4$)$_p$(OCF$_2$)$_q$—OCF$_2$—COOH and F—(CF$_2$CF$_2$CF$_2$O)$_n$—

CF$_2$CF$_2$COOH, alcohol-modified perfluoropolyethers such as HOCH$_2$—CF$_2$(OC$_2$F$_4$)$_p$(OCF$_2$)$_q$—OCF$_2$—CO$_2$H, and compounds in which saturated hydrocarbon groups such as an alkyl group, unsaturated hydrocarbon groups, aromatic hydrocarbon groups, or other functional groups are bonded to one or a part of a molecule. To describe concretely, the lubricant includes FOMBLIN Z DIAC and FOMBLIN Z DOL manufactured by Monte Catini Co., Ltd. and Demnam SA manufactured by Daikin Ind. Co., Ltd.

Example 2-1

FIG. 2A is a schematic diagram showing the magnetic tape for 8 mm video prepared according to the second embodiment of the present invention.

In FIG. 2A, the numeral 1 represents a PET (polyethylene terephthalate)—made support having a thickness of about 6 μm.

The numeral 2 represents a metal magnetic layer with a thickness of 2000 Å provided on the surface of the support 1 by oblique deposition.

The numeral 3 represents an Al—Cu alloy film (back coat layer) with a thickness of 2000 Å provided on a back face of the support 1 by deposition.

The numeral 4 represents a diamond-like carbon film (protective layer) with a thickness of 100 Å provided on the Co metal magnetic layer 2 by feeding benzene C$_6$H$_6$ at 16 sccm and O$_2$ at 24 sccm into a plasma reaction tube of an ECR microwave plasma CVD apparatus and carrying out ECR microwave plasma CVD under the conditions of a vacuum degree of 2.0 mTorr, a microwave output of 600 W and a running speed of the support of 10 m/min.

A Raman spectroscopic spectrum obtained by irradiating this diamond-like carbon film 4 with an Ar laser having an output of 300 mW (wavelength: 488 nm) by means of Triple Spectrometer manufactured by Specks Co., Ltd. is shown in FIG. 2B. According to this diagram, a peak is observed in the vicinity of 1550 cm$^{-1}$, and a ratio I$_G$/I$_B$ of a peak intensity I$_G$ in this peak to a background intensity I$_B$ is 1.46. That is, the diamond-like carbon film contains a fluorescent organic high polymer but a content of the fluorescent organic high polymer is small.

The signals 5a and 5b represent a fluorine series lubricant (FOMBLIN Z DIAC) with a thickness of 20 Å provided on the surface.

Example 2-2

The same procedure as that in Example 2-1 was repeated, except that the conditions of the ECR microwave plasma CVD were changed to a C$_6$H$_6$ feed amount of 24 sccm and a O$_2$ feed amount of 16 sccm.

A Raman spectroscopic spectrum obtained by irradiating this diamond-like carbon film 4 with the Ar laser having an output of 300 mW (wavelength: 488 nm) by means of Triple Spectrometer manufactured by Specks Co., Ltd. is shown in FIG. 2G. According to this diagram, a peak is observed in the vicinity of 1550. cm$^{-1}$, and a ratio I$_G$/I$_B$ of a peak intensity I$_G$ in this peak to a background intensity I$_B$ is 1.38. That is, the diamond-like carbon film contains a fluorescent organic high polymer but a content of the fluorescent organic high polymer is small.

Example 2-3

The same procedure as that in Example 2-1 was repeated, except that the conditions of the ECR microwave plasma CVD were changed to a C$_6$H$_6$ feed amount of 32 sccm and a O$_2$ feed amount of 8 sccm.

A Raman spectroscopic spectrum obtained by irradiating this diamond-like carbon film 4 with the Ar laser having an output of 300 mW (wavelength: 488 nm) by means of Triple Spectrometer manufactured by Specks Co., Ltd. is shown in FIG. 2D. According to this diagram, a peak is observed in the vicinity of 1550 cm$^{-1}$, and a ratio I$_G$/I$_B$ of a peak intensity I$_G$ in this peak to a background intensity I$_B$ is 1.25. That is, the diamond-like carbon film contains a fluorescent organic high polymer but a content of the fluorescent organic high polymer is small.

Example 2-4

The same procedure as that in Example 2-1 was repeated, except that C$_6$H$_6$ was changed to C$_2$H$_2$.

A Raman spectroscopic spectrum obtained by irradiating this diamond-like carbon film 4 with the Ar laser having an output of 300 mW (wavelength: 488 nm) by means of Triple Spectrometer manufactured by Specks Co., Ltd. is shown in FIG. 2E. According to this diagram, a peak is observed in the vicinity of 1550 cm$^{-1}$, and a ratio I$_G$/I$_B$ of a peak intensity I$_G$ in this peak to a background intensity I$_B$ is 1.52. That is, the diamond-like carbon film contains a fluorescent organic high polymer but a content of the fluorescent organic high polymer is small.

Example 2-5

The same procedure as that in Example 2-1 was repeated, except that C$_6$H$_6$ was changed to CH$_4$.

A Raman spectroscopic spectrum obtained by irradiating this diamond-like carbon film 4 with the Ar laser having an output of 300 mW (wavelength: 488 nm) by means of Triple Spectrometer manufactured by Specks Co., Ltd. is shown in FIG. 2F. According to this diagram, a peak is observed in the vicinity of 1550 cm$^{-1}$, and a ratio I$_G$/I$_B$ of a peak intensity I$_G$ in this peak to a background intensity I$_B$ is 1.22. That is, the diamond-like carbon film contains a fluorescent organic high polymer but a content of the fluorescent organic high polymer is small.

Comparative Example 2-1

The same procedure as that in Example 2-1 was repeated, except that only C$_6$H$_6$ was fed without feeding O$_2$.

A Raman spectroscopic spectrum obtained by irradiating this diamond-like carbon film with the Ar laser having an output of 300 mW (wavelength: 488 nm) by means of Triple Spectrometer manufactured by Specks Co., Ltd. is shown in FIG. 2G. According to this diagram, a weak peak in which a ratio I$_G$/I$_B$ of a peak intensity I$_G$ in this peak to a background intensity I$_B$ is 1.12 is observed in the vicinity of 1550 cm$^{-1}$.

Comparative Example 2-2

The same procedure as that in Example 2-1 was repeated, except that O$_2$ was changed to H$_2$, and the feed amounts of C$_6$H$_6$ and H$_2$ were changed to 16 sccm and 24 sccm, respectively.

A Raman spectroscopic spectrum obtained by irradiating this diamond-like carbon film with the Ar laser having an output of 300 mW (wavelength: 488 nm) by means of Triple Spectrometer manufactured by Specks Co., Ltd. is shown in FIG. 2H. According to this diagram, a very weak peak in which a ratio I$_G$/I$_B$ of a peak intensity I$_G$ in this peak to a background intensity I$_B$ is 1.01 is observed in the vicinity of 1550 cm$^{-1}$.

Comparative Example 2-3

The same procedure as that in Example 2-1 was repeated, except that the conditions of the ECR microwave plasma CVD were changed to a $C_6H_6$ feed amount of 8 sccm and a $O_2$ feed amount of 32 sccm.

A Raman spectroscopic spectrum obtained by irradiating this diamond-like carbon film with the Ar laser having an output of 300 mW (wavelength: 488 nm) by means of Triple Spectrometer manufactured by Specks Co., Ltd. is shown in FIG. 21. According to this diagram, a peak is observed in the vicinity of 1550 cm$^{-1}$, and a ratio $I_G/I_B$ of a peak intensity $I_G$ in this peak to a background intensity $I_B$ is 2.0.

[Properties]

The magnetic tapes for 8 mm VTR obtained in the respective examples described above were evaluated for outputs ((Y-S/N, C-S/N), jitters, and still durabilities. The results thereof are shown in Table 2-1.

TABLE 2-1

|  | Y-S/N (dB) | C-S/N (dB) | | Jitter (ns) | Still dura- bility (hr) |
| --- | --- | --- | --- | --- | --- |
|  |  | AM | PM |  |  |
| Example 2-1 | +1.2 | +0.8 | +0.8 | 43 | 5.8 |
| Example 2-2 | +1.0 | +1.1 | +1.0 | 43 | 5.2 |
| Example 2-3 | +0.6 | +0.8 | +0.8 | 50 | 4.2 |
| Example 2-4 | +0.8 | +1.0 | +0.6 | 45 | 5.0 |
| Example 2-5 | +0.6 | +0.8 | +0.4 | 52 | 3.8 |
| Comparative Example 2-1 | 0 | 0 | 0 | 72 | 0.83 |
| Comparative Example 2-2 | +0.1 | −0.2 | −0.2 | 78 | 0.80 |
| Comparative Example 2-3 | +0.1 | +0.1 | −0.2 | 74 | 1.2 |

*Still reproduction was carried out under an atmosphere of 20° C. and 50% RH, and the still durability was represented by time needed for the output to lower by 3 dB.

It can be found from the above results that when the protective layers provided on the metal magnetic layers of the magnetic tapes were formed according to the second embodiment of the present invention, the magnetic tapes are excellent in all of still durabilities, running properties and outputs.

Third Embodiment:

Next, it will be explained how to determine a background intensity $I_B$ and a peak intensity $I_G$ in the third embodiment of the present invention.

Triple Spectrometer manufactured by Specks Co., Ltd. was used as the measuring device, wherein a light source is an Ar laser having an output of 300 mW and a wavelength of 488 nm.

As shown in FIG. 3A, a sample S is irradiated with the Ar laser of 488 nm at a low angle θ of 5°, and scattered lights in a direction of 90° to the irradiating light out of the lights scattered from the sample S are spectrally determined by means of a measuring device (Triple Spectrometer). The measuring time (integrated time) is set to 10 minutes, and measurement is carried out at least at three points to determine the average value.

In order to determine $I_B$ and $I_G$, a blank level is first determined. That is, Triple Spectrometer was operated for 10 minutes without setting the sample S into Triple Spectrometer to determine the blank level of Triple Spectrometer as shown in FIG. 3-B. Then, the sample S is set into Triple Spectrometer, and Triple Spectrometer is operated for 10 minutes to obtain a Raman spectroscopic spectrum. An intensity $I_G$ in the peak in a region of 1400 to 1600 cm$^{-1}$ (height from the blank level up to the peak value in the peak point) and a background intensity $I_B$ in the peak described above (height up to a virtual line obtained by connecting the blank level in the peak point with a line before and behind the peak) are determined on the basis of the blank level described above. These values are measured at three or more points to determine the average values.

Inspections of the Raman spectroscopic spectra of the magnetic recording media in which a lubricant is provided on a protective layer by means of Triple Spectrometer show that a peak originating in a C—C bond of the lubricant is observed in a region of 1400 to 1600 cm$^{-1}$ in some cases. In such case, $I_G$ and $I_B$ after removing a peak originating in the C—C bond of this lubricant are determined to determine $I_G/I_B$. Or, the lubricant is removed in advance, and this is measured for a Raman spectroscopic spectrum with Triple Spectrometer to determine $I_G/I_B$.

The support used for the magnetic recording medium prepared according to the third embodiment of the present invention may be magnetic or non-magnetic. In general, it is non-magnetic. For example, flexible polymer materials including polyester such as PET, polyamide, polyimide, polysulfone, polycarbonate, olefin series resins such as polypropylene, cellulose series resins, and vinyl chloride series resins are used.

A magnetic layer of a metal thin film type is provided on this flexible support in a thickness of 500 to 5000 Å by means of dry plating such as vapor deposition and sputtering. Materials for magnetic particles which are used for forming the magnetic layer of a metal thin film type include, for example, Co—Ni alloy, Co—Pt alloy, Co—Ni—Pt alloy, Fe—Co alloy, Fe—Ni alloy, Fe—Co—Ni alloy, Fe—Co—B alloy, Co—Ni—Fe—B alloy, Co—Cr alloy, and alloys prepared by incorporating different kinds of metals into these alloys, as well as metals such as Fe, Co and Ni. The materials for forming the magnetic layer of a metal thin film type include as well nitrides (for example, Fe—N and Fe—N—O) and carbides ( for example, Fe—C and Fe—C—O) of the materials described above.

A protective layer having a thickness of 10 to 500 Å, particularly 30 to 200 Å is provided on this metal magnetic layer. This protective layer has the characteristics described above. Such protective layer can be formed by means of an ECR microwave plasma CVD apparatus. It is important to control conditions to feed gas (reaction gas) as follows. That is, hydrocarbon series gas such as methane, ethylene, acetylene, and benzene is used as gas fed into a plasma reaction tube. In particular, the protective layer is preferably formed by the ECR-CVD using hydrocarbon series compounds having unsaturated bonds including chain unsaturated hydrocarbons having double bonds and triple bonds, such as ethylene and acetylene, cyclic unsaturated hydrocarbons (aromatic hydrocarbons) such as benzene, toluene, benzoic acid, and benzaldehyde, naphthalene, and anthracene, which are diluted in benzene and toluene. That is, rapid film formation can be achieved by making use of these feed gases. In particular, hydrocarbon series compounds are preferably fed so that the vacuum degree falls in a range of 2×10$^{-4}$ to 5×10$^{-2}$ Torr, to thereby form the film under this atmosphere by means of the ECR-CVD. That is, the raw material (hydrocarbon) is fed under an atmosphere in which the air is exhausted in advance to a higher vacuum degree than 10$^{-6}$ Torr, so that the vacuum degree falls in a range of 2×10$^{-4}$ to 5×10$^{-2}$ Torr, and the ECR microwave plasma CVD is carried out, whereby a carbon series, particularly diamond-like carbon series protective layer having the characteristics described above can be formed in a rate of 200 to 10,000 Å/minute.

After forming the metal magnetic layer and the protective layer in the manners described above, a fluorine series lubricant layer is provided in a thickness of 20 to 70 Å by means of dipping or supersonic spraying. The lubricant includes, for example, carboxyl group-modified perfluoropolyethers, such as HOOC—$CF_2$—(O—$C_2F_4$)$_p$(O$CF_2$)$_q$—O$CF_2$—COOH and F—($CF_2CF_2CF_2O$)$_n$—$CF_2CF_2$COOH, alcohol-modified perfluoropolyethers such as HOCH$_2$—$CF_2$(O$C_2F_4$)$_p$(O$CF_2$)$_q$—O$CF_2$—$CO_2$H, and compounds in which saturated hydrocarbon groups such as an alkyl group, unsaturated hydrocarbon groups, aromatic hydrocarbon groups, or other functional groups are bonded to one or a part of a molecule. To describe concretely, the lubricant includes FOMBLIN Z DIAC and FOMBLIN Z DOL manufactured by Monte Catini Co., Ltd. and Demnam SA manufactured by Daikin Ind. Co., Ltd.

Example 3-1

FIG. 2A is a schematic diagram showing the magnetic tape for 8 mm video prepared according to the third embodiment of the present invention.

In FIG. 2A the numeral 1 represents a PET (polyethylene terephthalate)-made support having a thickness of about 6 μm.

The numeral 2 represents a metal magnetic layer with a thickness of 2000 Å provided on the surface of the support 1 by oblique deposition.

The numeral 3 represents an Al—Cu alloy film (back coat layer) with a thickness of 2000 Å provided on a back face of the support 1 by deposition.

The numeral 4 represents a diamond-like carbon film (protective layer) with a thickness of 100 Å provided on the Co metal magnetic layer 2 by feeding (feeding so that the vacuum degree is $9.0 \times 10^{-3}$ Torr when $C_6H_6$ is fed under an atmosphere of a vacuum degree of $9.0 \times 10^{-6}$ Torr) benzene $C_6H_6$ into the plasma reaction tube of the ECR microwave plasma CVD apparatus and carrying out the ECR microwave plasma CVD under the conditions of a microwave output of 600 W and a running speed of the support of 10 m/min.

A Raman spectroscopic spectrum obtained by measuring this diamond-like carbon film 4 with Triple Spectrometer is shown in FIG. 3B (measured before a fluorine series lubricant 5a, 5b are provided). According to this diagram, a peak is observed in the vicinity of 1550 cm$^{-1}$, and $I_B/I_G$ in this peak is 0.94. This diamond-like carbon film contains a fluorescent molecule (fluorescent organic high polymer).

The signals 5a and 5b represent a fluorine series lubricant (FOMBLIN Z DIAC) with a thickness of 20 Å provided on the surface.

Example 3-2

The same procedure as that in Example 3-1 was repeated, except that the conditions of the ECR microwave plasma CVD were changed so that the vacuum degree was $4.9 \times 10^{-3}$ Torr when $C_6H_6$ was fed under an atmosphere of a vacuum degree of $9.0 \times 10^{-6}$ Torr, and a running speed of the support was changed to 8 m/min.

A Raman spectroscopic spectrum obtained by measuring this diamond-like carbon film 4 with Triple Spectrometer is shown in FIG. 3C (measured before providing a fluorine series lubricant 5a, 5b). According to this diagram, a peak is observed in the vicinity of 1550 cm$^{-1}$, and $I_B/I_G$ in this peak is 0.86. This diamond-like carbon film contains a fluorescent molecule (fluorescent organic high polymer).

Example 3-3

The same procedure as that in Example 3-1 was repeated, except that the conditions of the ECR microwave plasma CVD were changed so that the vacuum degree was $1.2 \times 10^{-3}$ Torr when $C_6H_6$ was fed under an atmosphere of a vacuum degree of $9.0 \times 10^{-6}$ Torr, and a running speed of the support was changed to 6 m/min.

A Raman spectroscopic spectrum obtained by measuring this diamond-like carbon film 4 with Triple Spectrometer is shown in FIG. 3D (measured before providing a fluorine series lubricant 5a, 5b). According to this diagram, a peak is observed in the vicinity of 1550 cm$^{-1}$, and $I_B/I_G$ in this peak is 0.79. This diamond-like carbon film contains a fluorescent molecule (fluorescent organic high polymer).

Example 3-4

The same procedure as that in Example 3-1 was repeated, except that the conditions of the ECR microwave plasma CVD were changed so that the vacuum degree was $3.2 \times 10^{-4}$ Torr when $C_6H_6$ was fed under an atmosphere of a vacuum degree of $9.0 \times 10^{-6}$ Torr, and a running speed of the support was changed to 6 m/min.

A Raman spectroscopic spectrum obtained by measuring this diamond-like carbon film 4 with Triple Spectrometer is shown in FIG. 3E (measured before providing a fluorine series lubricant 5a, 5b). According to this diagram, a peak is observed in the vicinity of 1550 cm$^{-1}$, and $I_B/I_G$ in this peak is 0.69. This diamond-like carbon film contains a fluorescent molecule (fluorescent organic high polymer).

Example 3-5

The same procedure as that in Example 3-1 was repeated, except that the conditions of the ECR microwave plasma CVD were changed so that the vacuum degree was $2.4 \times 10^{-4}$ Torr when $C_6H_6$ was fed under an atmosphere of a vacuum degree of $9.0 \times 10^{-6}$ Torr, and a running speed of the support was changed to 4 m/min.

A Raman spectroscopic spectrum obtained by measuring this diamond-like carbon film 4 with Triple Spectrometer is shown in FIG. 3F (measured before providing a fluorine series lubricant 5a, 5b). According to this diagram, a peak is observed in the vicinity of 1550 cm$^{-1}$, and $I_B/I_G$ in this peak is 0.58. This diamond-like carbon film contains a fluorescent molecule (fluorescent organic high polymer).

Comparative Example 3-1

The same procedure as that in Example 3-1 was repeated, except that the conditions of the ECR microwave plasma CVD were changed so that the vacuum degree was $1.2 \times 10^{-2}$ Torr when $C_6H_6$ was fed under an atmosphere of a vacuum degree of $9.0 \times 10^{-6}$ Torr, and a running speed of the support was increased to 20 m/min.

A Raman spectroscopic spectrum obtained by measuring this diamond-like carbon film 4 with Triple Spectrometer is shown in FIG. 3G. According to this diagram, a peak is not observed in a region of 1400 to 1600 cm$^{-1}$.

Comparative Example 3-2

The same procedure as that in Example 3-1 was repeated, except that the conditions of the ECR microwave plasma CVD were changed so that the vacuum degree was $1.2 \times 10^{-4}$ Torr when $C_6H_6$ was fed under an atmosphere of a vacuum degree of $9.0 \times 10^{-6}$ Torr, and a running speed of the support was reduced to 2 m/min.

A Raman spectroscopic spectrum obtained by measuring this diamond-like carbon film 4 with Triple Spectrometer is shown in FIG. 3H. According to this diagram, a peak is observed in the vicinity of 1550 cm$^{-1}$, and $I_D/I_G$ in this peak is 0.53.

Comparative Example 3-3

The same procedure as that in Example 3-1 was repeated, except that the conditions of the ECR microwave plasma CVD were changed so that the vacuum degree was $9.2 \times 10^{-5}$ Torr when $C_6H_6$ was fed under an atmosphere of a vacuum degree of $9.0 \times 10^{-6}$ Torr, and a running speed of the support was changed to 1 m/min.

A Raman spectroscopic spectrum obtained by measuring this diamond-like carbon film 4 with Triple Spectrometer is shown in FIG. 3I. According to this diagram, a peak is observed in the vicinity of 1550 cm$^{-1}$, and a $I_D/I_G$ in this peak is 0.36.

[Properties]

The magnetic tapes for 8 mm VTR obtained in the respective examples described above were evaluated for outputs ((Y-S/N, C-S/N), jitters, and still durabilities. The results thereof are shown in Table 3-1.

TABLE 3-1

|  | | | C-S/N (dB) | | Jitter | Still dura- |
|---|---|---|---|---|---|---|
|  | $I_D/I_G$ | Y-S/N (dB) | AM | PM | (ns) | bility (hr) |
| Example 3-1 | 0.94 | +1.6 | +1.4 | +1.2 | 43 | 4.2 |
| Example 3-2 | 0.86 | +1.2 | +0.8 | +0.8 | 44 | 6.2 |
| Example 3-3 | 0.79 | +1.0 | +0.6 | +0.8 | 45 | 5.8 |
| Example 3-4 | 0.69 | +0.8 | +0.6 | +0.6 | 58 | 3.8 |
| Example 3-5 | 0.58 | +0.8 | +0.4 | +0.6 | 56 | 3.6 |
| Comparative Example 3-1 | 1 | 0 | 0 | 0 | 68 | 0.83 |
| Comparative Example 3-2 | 0.53 | +0.1 | -0.2 | -0.2 | 64 | 0.80 |
| Comparative Example 3-3 | 0.36 | +0.1 | -0.1 | +0.1 | 72 | 0.47 |

*Still reproduction was carried out under an atmosphere of 20° C. and 50% RH, and the still durability was represented by time needed for the output to lower by 3 dB.

It can be found from the above results that when the protective layers provided on the metal magnetic layers of the magnetic tapes were formed according to the present invention, the magnetic tapes are excellent in all of still durabilities, running properties and outputs.

Fourth Embodiment:

The protective layer containing high molecular weight fluorescent organic molecules and having a Raman spectrum of a specific gradient as described above can be formed by various publicly known methods. As described above, the protective layer is not restricted to DLC and can comprise various carbides, nitrides and oxides such as boron carbide, silicon carbide, boron nitride, silicon nitride, silicon oxide, and aluminum oxide. The protective layer is formed by forming it on the magnetic layer in a vacuum. The protective layer can be formed either by chemical vapor deposition (CVD) or physical vapor deposition (PVD). In the CVD, ECR plasma CVD using a microwave and a method using a high-frequency wave (RF) are effective. In the case where the protective layer is formed by the CVD, the raw material may be gaseous, liquid or solid. In order to suitably incorporate a high molecular weight fluorescent organic molecule, a carbon source comprising a compound having a covalent bond, for example, benzene is preferably used as a raw material.

The PVD includes heat evaporation, sputtering and ion plating. When DLC is formed by the sputtering, a graphite target can be used for sputtering in a mixed gas of methane and argon or a mixed gas of methane and hydrogen. When a protective layer of silicon oxide is formed, the target can be silicon, and a discharge gas can be a mixed gas of argon and oxygen. A thickness of the protective layer is not specifically restricted and is usually 10 to 300 Å.

The support used for the magnetic recording medium of the fourth embodiment in the present invention includes polyesters such as polyethylene terephthalate and polyethylene naphthalate; polyolefins such as polyethylene and polypropylene; cellulose derivatives such as cellulose triacetate and cellulose diacetate; polycarbonate; polyvinyl chloride; polyimide; and plastics such as aromatic polyamide. The supports have thicknesses of 3 to 50 μm.

The magnetic layer provided on the support may be of a coating type but is preferably a metal thin film type magnetic layer formed by vapor deposition. Magnetic materials for forming the magnetic layer include ferromagnetic metallic materials which are used for conventional metal thin film type magnetic recording media. They include, for example, ferromagnetic metals such as Co, Ni and Fe, and ferromagnetic alloys such as Fe—Co, Fe—Ni, Co—Ni, Fe—Co—Ni, Fe—Cu, Co—Cu, Co—Au, Co—Y, Co—La, Co—Pr, Co—Gd, Co—Sm, Co—Pt, Ni—Cu, Mn—Bi, Mn—Sb, Mn—Al, Fe—Cr, Co—Cr, Ni—Cr, Fe—Co—Cr, and Ni—Co—Cr. The magnetic layer is preferably a thin film of iron or a thin film of a ferromagnetic alloy comprising primarily iron, particularly preferably a thin film of at least one selected from a ferromagnetic alloy comprising primarily iron, cobalt and nickel, and nitrides or carbides thereof. The magnetic layer is formed preferably by so-called oblique deposition.

In the present invention, the magnetic layer is provided in two or more layers but 2 to 5 layers are considered suitable as a practical range. The magnetic layer has, in the case of two layers, preferably a thickness of 100 to 2000 Å for a lower magnetic layer and a thickness of 50 to 1000 Å for an upper magnetic layer, and in the case of three layers, preferably a thickness of 100 to 2000 Å for a lower magnetic layer, a thickness of 100 to 1000 Å for an intermediate magnetic layer, and a thickness of 50 to 1000 Å for an upper magnetic layer.

Further, in the magnetic recording medium of the fourth embodiment of the present invention, a back coat layer can be formed on a face opposite to the magnetic layer. The back coat layer may be formed either before or after the formation of the magnetic layer. The back coat layer may be formed by applying a back coat paint by conventional methods, or can be formed by depositing metal or semi-metal in a vacuum. Further, a top coat layer comprising a suitable lubricant can be formed as well on the protective layer. The top coat layer is formed by applying a fluorine series lubricant on the magnetic layer in the air or spraying it thereon in a vacuum. When providing the back coat layer, a top coat layer can be formed as well thereon.

Example 4-1

A cobalt magnetic layer having a thickness of 2000 Å was formed in a thickness of 2000 Å on a PET film having a thickness of 6 μm by oblique deposition. In the deposition, the vacuum degree was controlled to $5 \times 10^{-5}$ Torr; the film running speed was kept at 100 m/minute; an output of an electron beam was set to 100 kW; and oxygen was flowed at a flow amount of 600 SCCM. Then, a protective layer having a film thickness of 100 Å was formed by sputtering with graphite used as a target, wherein an exhaust vacuum degree in a chamber was controlled to $9.0 \times 10^{-6}$ Torr; and gas prepared by blending argon and hydrogen in a ratio of 4:6 was fed into the chamber at such flow amount that the vacuum degree in forming the film was maintained at $6.0 \times 10^{-3}$ Torr. In sputtering, the voltage, the output and a running speed of the film were set to 430 V, 2 kW and 0.5 m/minute, respectively.

The protective layer thus obtained was measured for a Raman spectrum. A multiple spectrometer [Triple Spectrometer] manufactured by Specks Co., Ltd. was used as a Raman spectrometer, wherein an argon laser having a wavelength of 488 nm was used at an output of 300 mW; and applying time (integrated time) was set to 600 seconds. The laser was applied at a low angle of about 5° to the sample face, and lights scattered in a direction of 90° to the laser beam out of lights scattered from the sample were collected and spectrally determined by means of a detector. Measurement is carried out at least at three points per one sample to determine the average value. Further, the detector was operated for 600 seconds without setting the sample in the spectrometer to determine the blank level. A net Raman spectrum obtained by deducting the blank level is shown in FIG. 4C. A gradient a between an intensity ($I_{800}$) in 800 cm$^{-1}$ and an intensity ($I_{2000}$) in 2000 cm$^{-1}$, which was determined from this spectrum, was 1.2.

Example 4-2

A magnetic layer and a protective layer were formed in the same conditions as those in Example 4-1, except that the film running speed in sputtering was changed to 0.6 m/minute, and a flow amount of a mixed gas was controlled so that the vacuum degree in forming the film was $8.0 \times 10^{-3}$ Torr. Further, a net Raman spectrum of the protective layer was determined in the same manner as that in Example 4-1. This is shown in FIG. 4D, wherein the gradient a was 1.6.

Example 4-3

A magnetic layer and a protective layer were formed in the same conditions as those in Example 4-1, except that the film running speed in sputtering was changed to 0.7 m/minute, and a flow amount of a mixed gas was controlled so that the vacuum degree in forming the film was $1.2 \times 10^{-2}$ Torr. Further, a net Raman spectrum of the protective layer was determined in the same manner as that in Example 4-1. This is shown in FIG. 4E, wherein the gradient a was 2.1.

Comparative Example 4-1

A magnetic layer and a protective layer were formed in the same conditions as those in Example 4-1, except that a mixed ratio of argon and hydrogen contained in a mixed gas was set to 5:5, and the film running speed in sputtering was controlled to 0.4 m/minute. Further, a net Raman spectrum of the protective layer was determined in the same manner as that in Example 4-1. This is shown in FIG. 4F, wherein the gradient a was 0.96.

Comparative Example 4-2

A magnetic layer and a protective layer were formed in the same conditions as those in Comparative Example 4-1, except that the film running speed in sputtering was changed to 0.3 m/minute, and a flow amount of a mixed gas was controlled so that the vacuum degree in forming the film was $6.0 \times 10^{-3}$ Torr. Further, a net Raman spectrum of the protective layer was determined in the same manner as that in Example 4-1. This is shown in FIG. 4G, wherein the gradient a was 0.91.

A back coating paint prepared by dispersing carbon black having an average particle diameter of 40 nm in a binder resin comprising a urethane prepolymer and a vinyl chloride series resin was applied to a dry film thickness of 0.5 μm by die coating on a side opposite to a face of the PET film on which the magnetic layer was formed in the processed films obtained in the examples and the comparative examples, and dried to form a back coat layer. Then, a paint prepared by diluting and dispersing perfluoropolyether (FOMBLIN AM2001 manufactured by Aujimont Co., Ltd.) in a fluorine series inert liquid (PF-5080 manufactured by Sumitomo Three M Co., Ltd.) in a proportion of 0.05 weight % was applied on the protective layer to a dry film thickness of 15 Å by die coating and dried at 100° C. to form a lubricant layer. The film thus obtained was slit to a width of 8 mm, and the slit film was loaded into a cassette to prepare a video cassette for Hi-8.

A head touch of the video cassette obtained above was evaluated by an envelope wave form. In the evaluation, an apparatus obtained by remodeling a commercially available VTR for Hi-8 was used so that optional signals could be recorded and reproduced. The signals were recorded in a sine wave having a frequency of 7 MHz at a recording level of a maximum output. Reproduced signals were measured by means of a TR4271 type spectrum analyzer manufactured by Advantest Co., Ltd. in the conditions of RBW (Resolution Band Width) of 10 kHz, VBW (Video Band Width) of 30 kHz, a frequency span of 0 MHz, a sweep time of 40 ms, and an average of 16 times. In the envelope thus obtained, a front output ratio was defined by difference obtained by deducting an amplitude (Sin) in a front break part from a maximum value (Sm) in an amplitude of a wave form as shown in FIG. 4H. The front output ratio means a changed output which occurs when the head starts touching at the front part. The results are shown in Table 4-1.

TABLE 4-1

|  | Front output ratio (dB) |
|---|---|
| Example 4-1 | 0.2 |
| Example 4-2 | 0.2 |
| Example 4-3 | 0.3 |
| Comparative Example 4-1 | 1 |
| Comparative Example 4-2 | 1.2 | we claim:

1. A magnetic recording medium comprising a support, a magnetic layer formed on the support, and a protective layer formed on the magnetic layer and comprising a carbon thin film, wherein the carbon thin film has a ratio of an intensity ($C_{2000}$) at 2000 cm$^{-1}$ to an intensity ($C_{1000}$) at 1000 cm$^{-1}$ of $C_{2000}/C_{1000} \geq 1.8$, which is determined by Raman spectroscopic analysis, and wherein the carbon thin film contains a material that fluoresces when irradiated.

2. A magnetic recording medium comprising a support, a magnetic layer formed on the support, and a protective layer formed on the magnetic layer and comprising a carbon thin film, wherein the carbon thin film, has a peak in a region of 1400 to 1600 cm$^{-1}$ in a Raman spectroscopic spectrum, and a ratio $I_B/I_G$ of a background intensity $I_B$ to a peak intensity $I_G$ in this peak is 0.56 or more and less than 1.0, and wherein the carbon thin film contains a material that fluoresces when irradiated.

3. A magnetic recording medium as described in claim 2, wherein $I_B/I_G$ is 0.69 to 0.94.

4. A magnetic recording medium comprising a support, a magnetic layer formed on the support, and a protective layer formed on the magnetic layer, wherein a Raman spectrum in the protective layer satisfies a relation in which a gradient $a=(I_{2000}-I_{800})/(2000-800)$ between an intensity $(I_{800})$ at 800 cm$^{-1}$ and an intensity $(I_{2000})$ at 2000 cm$^{-1}$ is $a \geq 1.0$ after carrying out a blank correction.

5. A magnetic recording medium comprising a support, a magnetic layer formed on the support, and a protective layer formed on the magnetic layer and comprising a carbon thin film, wherein the carbon thin film has a peak in a region of 1400 to 1600 cm$^{-1}$ in a Raman spectroscopic spectrum, and a ratio $I_B/I_G$ of a background intensity $I_B$ to a peak intensity $I_G$ in this peak is 1/1.2 to 1/1.8, and wherein the carbon thin film contains a material that fluoresces when irradiated.

* * * * *